United States Patent
Mehendale et al.

(10) Patent No.: US 11,988,641 B2
(45) Date of Patent: May 21, 2024

(54) CHARACTERIZATION OF PATTERNED STRUCTURES USING ACOUSTIC METROLOGY

(71) Applicant: Onto Innovation Inc., Wilmington, MA (US)

(72) Inventors: Manjusha Mehendale, Morristown, NJ (US); Michael Kotelyanskii, Chatham, NJ (US); Priya Mukundhan, Lake Hopatcong, NJ (US); Robin Mair, West Chicago, IL (US)

(73) Assignee: Onto Innovation Inc., Wilmington, MA (US)

( * ) Notice: Subject to any disclaimer, the term of this patent is extended or adjusted under 35 U.S.C. 154(b) by 321 days.

(21) Appl. No.: 17/217,527

(22) Filed: Mar. 30, 2021

(65) Prior Publication Data

US 2021/0318270 A1    Oct. 14, 2021

Related U.S. Application Data

(60) Provisional application No. 63/008,903, filed on Apr. 13, 2020.

(51) Int. Cl.
*G01N 29/24* (2006.01)
*G01N 29/06* (2006.01)

(52) U.S. Cl.
CPC ......... *G01N 29/2418* (2013.01); *G01N 29/06* (2013.01); *G01N 2291/2697* (2013.01)

(58) Field of Classification Search
CPC ............. G01N 2291/044; G01N 29/06; G01N 29/2418; G01N 2291/0044
See application file for complete search history.

(56) References Cited

U.S. PATENT DOCUMENTS 10,309,893 B2 *   6/2019   Georgeson ......... G01N 29/4436
2001/0028460 A1 * 10/2001   Maris ................. G01N 29/0681
                                                        356/432

(Continued)

FOREIGN PATENT DOCUMENTS

JP    2682461 B2    8/1997
WO    99/61866     12/1999

OTHER PUBLICATIONS

Int'l Search Report, PCT/US2021/024881, dated Jul. 16, 2021, 11 pages.

*Primary Examiner* — Dominic J Bologna
*Assistant Examiner* — Adrian Ignacio Silva
(74) *Attorney, Agent, or Firm* — Paradice & Li LLP

(57) ABSTRACT

Systems and methods for inspecting or characterizing samples, such as by characterizing patterned features or structures of the sample. In an aspect, the technology relates to a method for characterizing a patterned structure of a sample. The method includes directing a pump beam to a first position on a surface of the sample to induce a surface acoustic wave in the sample and directing a probe beam to a second position on the sample, where the probe beam is affected by the surface acoustic wave when the probe beam reflects from the surface of the sample. The method also includes detecting the reflected probe beam, analyzing the detected reflected probe beam to identify a frequency mode in the reflected probe beam, and based on the identified frequency mode, determining at least one of a width or a pitch of a patterned feature in the sample.

23 Claims, 19 Drawing Sheets

(56) References Cited

U.S. PATENT DOCUMENTS

| | | | |
|---|---|---|---|
| 2003/0112451 A1* | 6/2003 | Mautz | B24B 37/04 |
| | | | 356/630 |
| 2004/0174538 A1* | 9/2004 | Opsal | G01N 21/1717 |
| | | | 356/601 |
| 2006/0256916 A1 | 11/2006 | Kotelyanskii et al. | |
| 2010/0332203 A1* | 12/2010 | Maris | G01N 21/1717 |
| | | | 703/6 |
| 2012/0309116 A1* | 12/2012 | Colgan | G01N 29/2418 |
| | | | 257/E21.525 |
| 2016/0043008 A1* | 2/2016 | Murray | H01L 22/20 |
| | | | 438/5 |
| 2017/0221778 A1 | 8/2017 | Mehendale et al. | |
| 2021/0164928 A1* | 6/2021 | Lubinski | A61B 5/14532 |

* cited by examiner

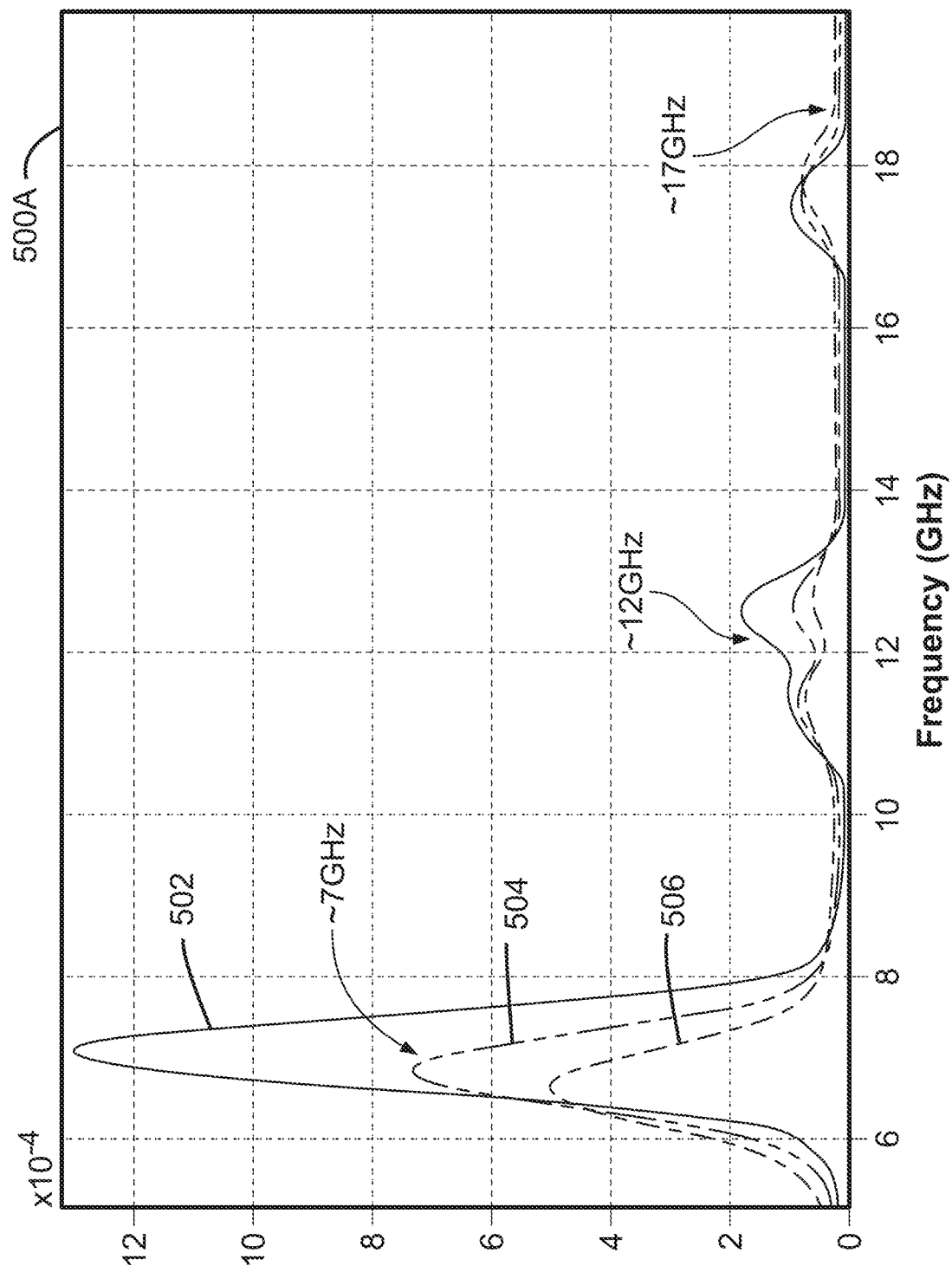

CHARACTERIZATION OF PATTERNED STRUCTURES USING ACOUSTIC METROLOGY

RELATED APPLICATION

This application claims the benefit of U.S. Provisional Application No. 63/008,903, filed on Apr. 13, 2020, and titled "Characterization of Patterned Structures Using Acoustic Metrology," the entirety of which is incorporated herein by reference.

INTRODUCTION

Optically opaque materials such as metals and amorphous carbon are ubiquitous in modern nanoelectronic memory and logic devices. As their growth is usually not selective, i.e. they grow as blanket layers covering full wafers uniformly, optical techniques quickly become blind to any underlying material. As such, this leads e.g. to alignment and overlay challenges in the semi-damascene process flow or after the processing of the magnetic tunnel junction (MTJ) of a Magnetic Random-Access Memory. To mitigate this problem, mask alignment either relies on the topography transferred to the surface of the metal layer, leading to obvious accuracy issues, or requires extra expensive and time-consuming etch steps.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for inspecting or characterizing samples, such as by characterizing patterned features or structures of the sample. In an aspect, the technology relates to a method for characterizing a patterned structure of a sample. The method includes directing a pump beam to a first position on a surface of the sample to induce a surface acoustic wave in the sample and directing a probe beam to a second position on the sample, wherein the probe beam is affected by the surface acoustic wave when the probe beam reflects from the surface of the sample. The method also includes detecting the reflected probe beam; analyzing the detected reflected probe beam to identify a frequency mode in the reflected probe beam; and based on the identified frequency mode, determining at least one of a width or a pitch of a patterned feature in the sample.

In an example, the frequency mode is between 1 GHz and 50 GHz. In another example, the first position and second position are the same. In yet another example, the first position is separated from the second position by at least 10 µm. In still another example, the patterned feature is a metal line. In a further example, the patterned feature is embedded under the surface of the sample. In still yet another example, the width of the patterned feature is less than 200 nm. In another example, the method includes performing additional manufacturing steps on the sample.

In another aspect, the technology relates to a method for characterizing a sample. The method includes directing a pump beam to a first position on a surface of the sample to induce a first surface acoustic wave in the sample; directing a probe beam to a second position on the sample, wherein the probe beam is affected by the first surface acoustic wave when the probe beam reflects from the second position, wherein the first position is separated from the second position by a first distance; detecting the probe beam reflected from the second position; directing the pump beam to a third position on the surface of the sample to induce a second surface acoustic wave; directing the probe beam to a fourth position on the surface of the sample, wherein the probe beam is affected by the second surface acoustic wave when the probe beam reflects from the fourth position, wherein the third position is separated from the fourth position by a second distance; detecting the probe beam reflected from the fourth position; and based on the detected probe beam reflected from the second position and the detected probe beam reflected from the fourth position, determining at least one characteristic of the sample.

In an example, the at least one characteristic is a characteristic of a patterned feature embedded below the surface of the sample. In another example, the at least one characteristic is a characteristic of a patterned feature. In a further example, the method further includes determining a frequency mode at least one of the detected probe beam reflected from the second position or the detected probe beam reflected from the fourth position. In yet another example, determining the at least one characteristic is further based on the determined frequency mode. In still another example, the method further includes determining a delay until the frequency mode the frequency mode is present. In yet another example, determining the at least one characteristic is further based on the determined delay.

In another example, the first distance is less than 10 µm and the second distance is at least 15 µm. In a further example, the method also includes performing additional manufacturing steps on the sample.

In another aspect, the technology relates to a system for characterizing a patterned structure in a sample. The system includes at least one light source for generating a pump beam and a probe beam; optical components configured to direct the pump beam to a first position on the sample and direct the pump beam to a second position on the sample; a detector configured to detect the probe beam after reflecting from the second position; a processor; and memory storing instructions that when executed by the processor cause the processor to perform a set of operations. The set of operations include identifying a frequency mode in the detected probe beam; and based on the identified frequency mode, determining at least one of a width or a pitch of the patterned structure.

In an example, the patterned structure is embedded under the surface of the sample. In yet another example, the first position is separated from the second position by at least 10 µm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 5A-5B depicts a Fourier Transform (FT) for data presented in FIG. 3.

DETAILED DESCRIPTION

As discussed above, optically opaque materials present a series of challenges and issues in manufacture, including alignment and overlay challenges. Some prior solutions to those problems rely on topography transferred to the surface of the metal layer, leading to obvious accuracy issues, or using extra expensive and time-consuming etch steps. The present technology utilizes picosecond ultrasonic (PU) measurement as an alternative because the generated and measured acoustic waves do propagate through these optically opaque materials. Use of PU to generate and detect high frequency surface acoustic waves (SAWs) in the gigahertz (GHz) range on a periodically patterned nanostructures has a strong correlation between the frequency of the acoustic mode and the pitch of the sample, allowing for characteristics of the sample to be determined.

PU measurement involves inducing acoustic waves in the sample by focusing a sub-picosecond laser pulse and detecting the return of the partially reflected acoustic wave from the interface with another material as a function of time using another short pulse derived from the same laser. The present technology utilizes PU measurement techniques to characterize periodically patterned nanostructures. For example, based on the sensitivity of PU techniques to metal line arrays of various geometries, the frequency profile of generated acoustics may be used to determine the pitch and/or width of features in a sample, such as metal lines. The features of the sample may be exposed or embedded in the sample.

Figure 1A:
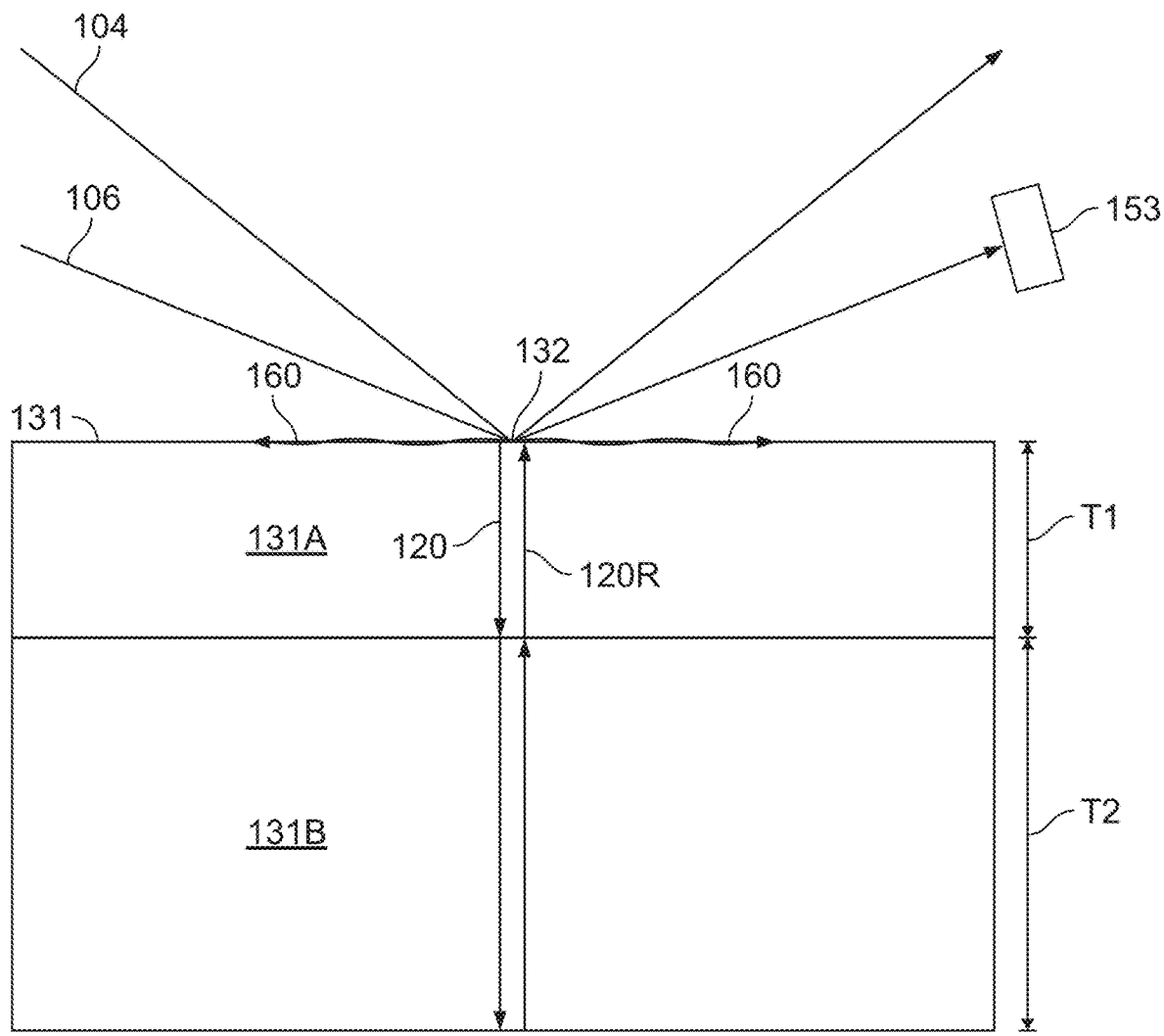
FIG. 1A depicts a portion of an example metrology system for inspecting a sample.

FIG. 1A depicts a portion of an example metrology system 100 for measuring or inspecting a sample 131 having a first layer 131A and a second layer 131B. In system 100, a pump pulse travels along the pump beam path 104 and is directed to the measurement point 132. When the pump pulse reaches the measurement point 132, a bulk acoustic wave (BAW) 120 is generated that travels internally into the bulk of the sample 131. In addition, a surface acoustic wave (SAW) 160 is also generated that travels across the surface of the sample 131. The bulk acoustic wave 120 travels through the sample 131 until reaching a boundary between the first layer 131A and the second layer 131B. At the boundary, a portion of the bulk acoustic wave 120 is reflected back towards the surface of the sample 131, as depicted by reflected acoustic wave 120R. A portion of the bulk acoustic wave 120 also continues through the boundary into the second layer 131B. When the bulk acoustic wave 120 reaches the edge of the sample 131, it is reflected back towards the surface of the sample 131. Similarly, the surface acoustic wave 160 travels across the surface of the sample 131 and reflects, or partially reflects, from features near the surface of the sample 131.

Subsequent to the pump pulse reaching the measurement point 132, a probe pulse travels along the probe beam path 106 to the measurement point 132. In some examples, the pump pulse and the probe pulse may reach different points on the surface of the sample 131, as discussed further below with reference to FIG. 2A. The probe pulse reflects from the measurement point 132 and continues to follow the probe beam path 106 until it reaches a detector 153. If the reflected acoustic wave 120R has reached the surface of the sample 131 at about the same time that the probe pulse reaches the measurement point 132, the probe pulse is affected by the reflected acoustic wave 120R. When the reflected probe pulse is detected, the effects of the reflected acoustic wave 120R on the probe pulse can be identified in the signal generated by the detector 153. Similarly, if a surface acoustic wave 160 or a reflected surface acoustic wave is present at the measurement point 132 (or at the location on the surface where the probe pulse is directed), the probe pulse is affected by the surface acoustic wave 160.

Figure 1B:
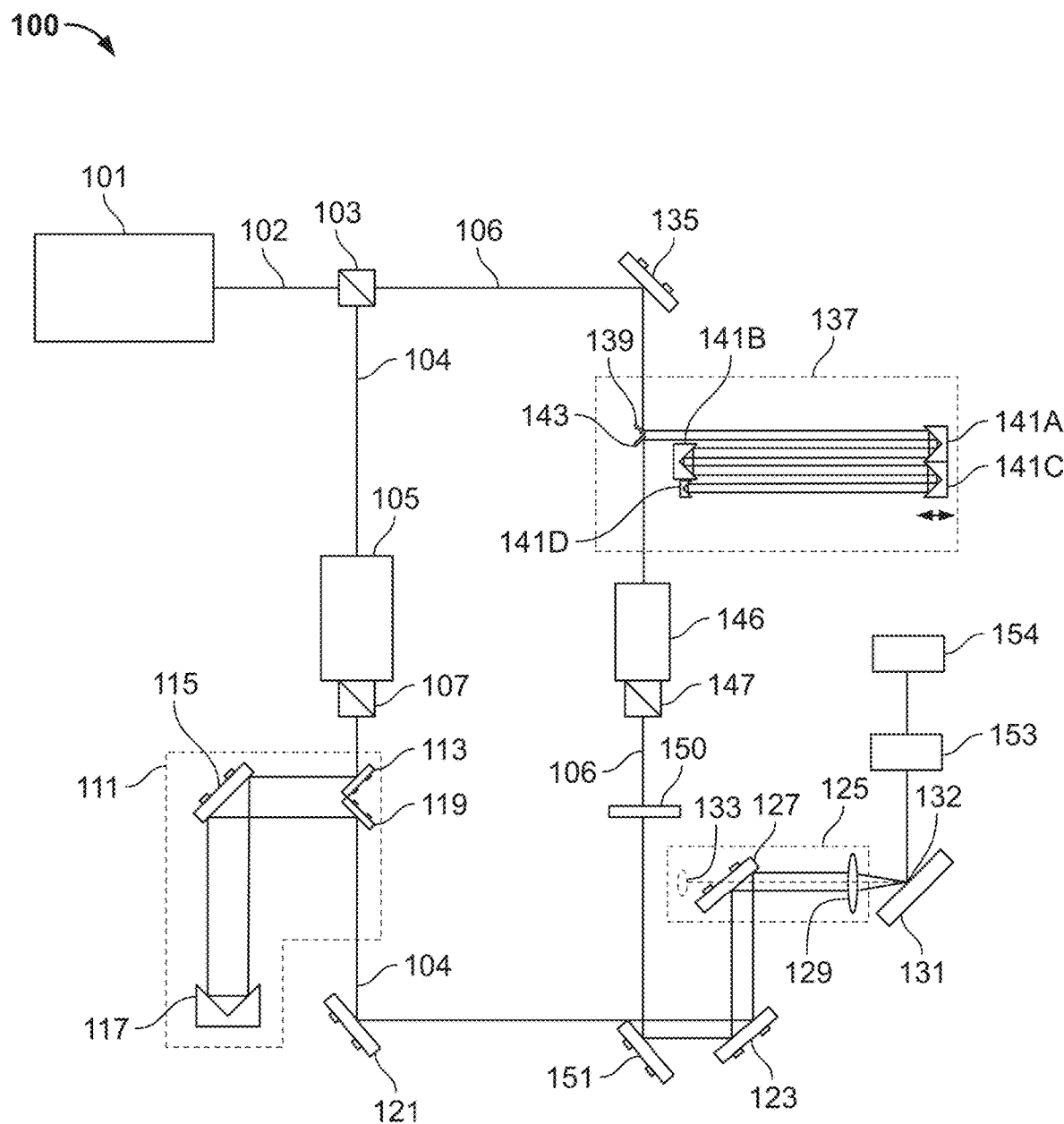
FIG. 1B depicts a schematic view of the example metrology system depicted in FIG. 1A.

Additional details regarding the example metrology system 100 are depicted in FIG. 1B, which depicts a schematic view of the example metrology system 100. In implementation, system 100 may include a fewer number or greater number of components than depicted in FIG. 1B. In system 100, a light source 101, such as a laser, emits a light pulse that follows beam path 102. A first beam splitter 103 is located in the beam path 102. The first beam splitter 103 splits the light pulse emitted from the light source 101 into a pump pulse that follows pump beam path 104 and a probe pulse that follows probe beam path 106. As used herein, a beam splitter is an optical devices that can split an incident light beam or pulse into two or more beams. In examples, the beam splitters may be plate or cube beam splitters, such as a cube polarizer.

The pump pulse follows the pump beam path 104 and reaches a pump beam optical modulator 105. In some examples, the pump beam optical modulator 105 modulates the pump pulse. The frequency at which the pump pulse is modulated may be in the range of several megahertz (MHz), such as about 5 or 5.5 MHz. Other frequencies may also be utilized. The modulated pump pulse then continues to follow the pump beam path 104 and may reach a pump beam splitter 107 located after the pump beam optical modulator 105 in the pump beam path 104. The pump beam splitter 107 splits the modulated pump pulse.

The pump pulse continues along the pump beam path 104 into a pump beam delay stage 111. The pump beam delay stage 111 extends the length of the pump beam path 104 and thus increases the time for the pump pulse to reach the measurement point. In some examples, however, the pump beam delay stage 111 may be omitted. The pump beam delay stage 111 includes a first pump beam delay mirror 113, second pump beam delay mirror 115, pump beam delay retroreflector 117, and a third pump beam delay mirror 119. The first pump beam delay mirror 113 directs the pump pulse to the second pump beam delay mirror 115. The second pump beam delay mirror 115 directs the pump pulse to the pump beam delay retroreflector 117. The pump beam delay retroreflector 117 directs the pump pulse back to the second pump beam delay mirror 115, which directs the pump pulse to the third pump beam delay mirror 119. The third pump beam delay mirror 119 directs the pump pulse to a pump beam directional mirror 121. The pump beam directional mirror 121 directs the pump pulse to a directional mirror 123, which directs the pump pulse to a plurality of focusing optics 125.

Some elements of the pump beam delay stage 111 may also be adjustable. For instance, position of the pump beam delay retroreflector 117 may be adjusted closer to, or further from, the second pump beam delay mirror 115. As an example, the pump beam delay retroreflector 117 may be on a stage controlled by a motor, a servo, and/or a piezoelectric controller, among other possible controllers. Moving the pump beam delay retroreflector 117 closer to the second pump beam delay mirror 115 shortens the total path length for the pump beam pulse, and thus increases the delay between the pump beam pulse and the probe beam pulse(s). In contrast, moving the pump beam delay retroreflector 117 further from the second pump beam delay mirror 115 lengthens the total path length for the pump beam pulse, and thus shortens the delay between the pump beam pulse and the probe beam pulse(s).

The focusing optics 125 include a focusing mirror 127, a focusing lens 129, and a height detection system 133. The focusing optics 125 are positioned to direct and focus the probe pulse onto the measurement point 132 of the sample 131. In the example depicted in FIG. 1B, the pump pulse continues from the directional mirror 123 along the pump beam path 104 until it reaches the focusing mirror 127. The focusing mirror 127 directs the pump pulse through a focusing lens 129, which focuses the pump pulse to the measurement point 132.

The pump pulse reaches the measurement point 132, which generates the bulk acoustic wave 120 that travels through the bulk of the sample 131 and the surface acoustic wave 160 that travels along the surface of the sample 131. The pump pulse is also reflected from the measurement point 132 and the reflected pump pulse may be captured by the detector 153 or a beam dump (not depicted). In some examples, because the reflected pump pulse is not generally analyzed, the reflected pump beam may be filtered out by the detector 153 or prior to reaching the detector 153.

Returning back to the first beam splitter 103 discussed above, the first beam splitter 103 also splits the light pulse from the light source 101 into a probe pulse that follows probe beam path 106. The probe pulse travels along the probe beam path 106 and is directed by a probe beam directional mirror 135. The probe beam directional mirror 135 directs the probe pulse to an extended probe beam delay stage 137.

The extended probe beam delay stage 137 is configured to extend the length of the probe beam path 106 and thus create delay between the time the pump pulse reaches the measurement point 132 and the time the probe pulse reaches the measurement point 132. The extended probe beam delay stage 137 extends the probe beam path 106. The extended probe beam delay stage 137 includes a first probe beam delay mirror 139 that directs the probe pulse to a first probe beam delay retroreflector 141A. The first probe beam delay retroreflector 141A directs the probe pulse to a second probe beam delay retroreflector 141B, which directs the probe pulse to a third probe beam delay retroreflector 141C, which the directs the probe pulse to a fourth probe beam delay retroreflector 141D. From the fourth probe beam delay retroreflector 141D, the probe pulse returns back through the plurality of probe beam delay retroreflectors 141. For instance, the fourth probe beam delay retroreflector 141D directs the probe pulse back to the third probe beam delay retroreflector 141C, which reflects the probe pulse to the second probe beam delay retroreflector 141B, which reflects the probe pulse to the first probe beam delay retroreflector 141A. The first probe beam delay retroreflector 141A then reflects the probe pulse to a second probe beam delay mirror 143.

The extended probe beam delay stage 137 may also be adjustable. For example, the first probe beam delay retroreflector 141A and the second probe beam delay retroreflector 141B may be on a stage controlled by a motor, a servo, and/or a piezoelectric controller, among other possible controllers. Thus, the first probe beam delay retroreflector 141A and the third probe beam delay retroreflector 141C may be moved closer to the second probe beam delay retroreflector 141B and the fourth probe beam delay retroreflector 141D. Moving the respective probe beam delay retroreflectors 141 closer or further from one another reduces or increases the overall path length for the probe pulse, which reduces or increases the delay between the pump pulse and the probe pulse. Accordingly, if a particular delay time is desired, that delay time can be achieved by adjusting the relative positions of the probe beam delay retroreflectors 141.

In the example depicted, the extended probe beam delay stage 137 includes four probe beam delay retroreflectors 141 to create an eight-pass delay stage. In other examples, the extended probe beam delay stage 137 may include more than four probe beam delay retroreflectors 141. For instance, the extended probe beam delay stage 137 may include eight probe beam delay retroreflectors 141 to create a sixteen-pass delay stage.

Once the probe pulse reaches the second probe beam delay mirror 143 from the extended probe beam delay stage 137, the second probe beam delay mirror 143 directs the probe pulse along the probe beam path 106 to an optional probe beam optical modulator 146. The probe beam optical modulator 146 modulates the probe pulse at a different frequency than the pump beam light has been modulated. For example, the probe beam optical modulator 146 may modulate the probe pulse at a frequency that is an order of magnitude different than the modulation frequency for the pump beam. In some examples, the probe beam optical modulator 146 may be omitted. The modulated probe pulse then reaches probe beam splitter 147. The probe pulse continues along the probe beam path 106 and passes through a half-wave plate 150. The half-wave plate 150 alters the polarization of the primary probe pulse, such as by rotating the polarization of the primary probe pulse by 90 degrees. From the half-wave plate 150, the probe pulse continues along the probe beam path 106 and reaches a probe beam directional mirror 151. In some examples of the metrology system 100, the half-wave plate 150 and the probe beam splitter 147 may be omitted. In such examples, the probe pulse may travel directly from the extended probe beam delay stage 137 to the probe beam directional mirror 151.

The probe beam directional mirror 151 directs the probe pulse to the directional mirror 123, which directs the probe pulse to the focusing optics 125. The focusing optics 125 focus the probe pulse onto the measurement point 132 of the sample 131. For instance, the focusing mirror 127 directs the probe pulse through the focusing lens 129, which focuses the probe pulse onto the measurement point 132. The probe pulse then reflects off the surface of the sample 131 to the detector 153. The detector 153 detects the probe pulse after it has reflected from the measurement point 132. The detector 153 may convert the reflected probe pulse into an electrical signal, which may be in a digital or analog format. The detector 153 passes the signal to a signal processing and analysis system 154 where the signal is analyzed. The signal processing and analysis system 154 is able to determine thicknesses of the sample 131 based on the signal(s) received from the detector 153.

In some examples, additional optical components, such as mirrors, lenses, fiber optics, or other suitable components, cause the pump pulse to reach a first position on the surface of the sample 131 and the probe pulse to reach a second position on the surface of the sample 131. The detector 153 may be appropriately positioned to detect the probe pulse after reflecting from the sample 131. In other examples, multiple detectors 153 may be implemented to detect both the reflected probe pulses and the reflected pump pulses. Additional details regarding a suitable operating environment for the signal processing and analysis system 154 are discussed in further detail below with reference to FIG. 1C.

Figure 1C:
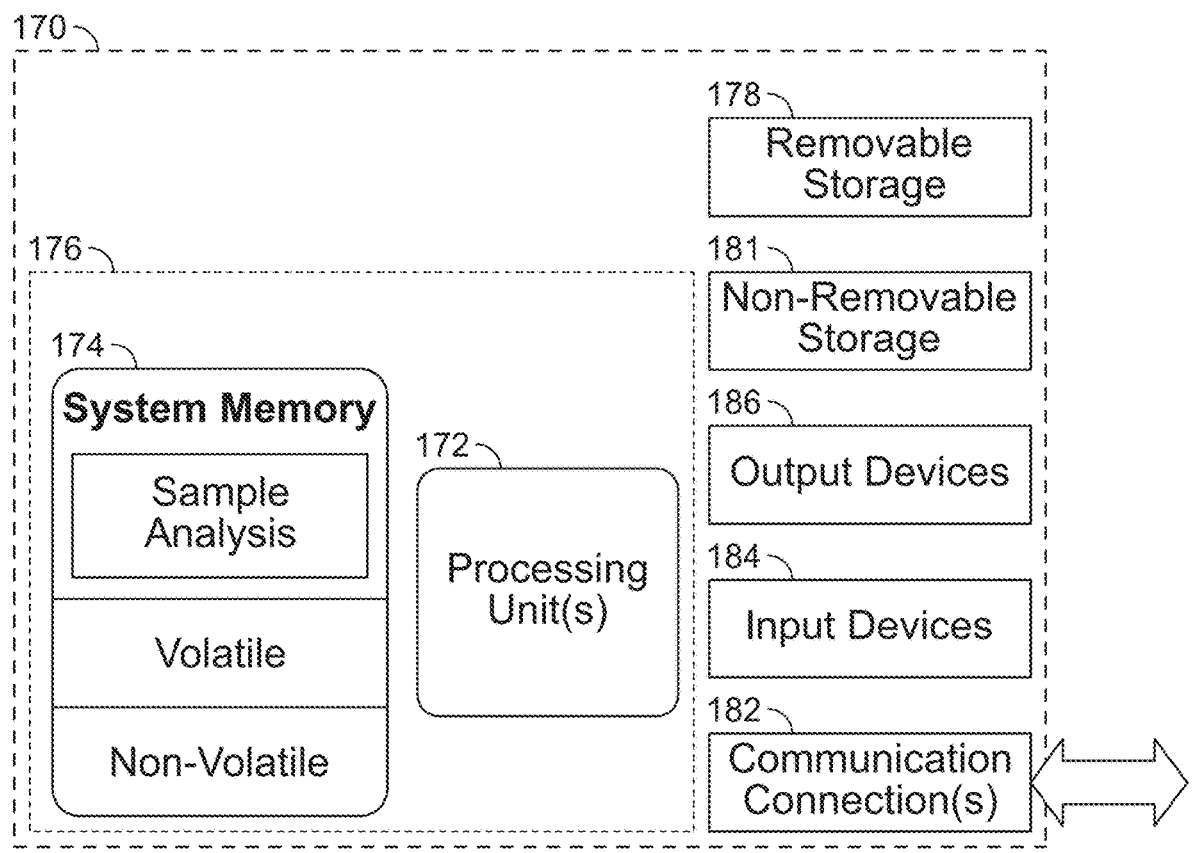
FIG. 1C depicts an example of a suitable operating environment for analyzing signals.

FIG. 1C illustrates one example of a suitable operating environment 170 in which one or more of the present examples of signal processing and analysis systems may be implemented, such as the signal processing and analysis system 154. This operating environment may be incorporated directly into the systems disclosed herein, or may be incorporated into a computer system discrete from, but used to control, the metrology systems described herein. This is only one example of a suitable operating environment and is not intended to suggest any limitation as to the scope of use or functionality. Other computing systems, environments, and/or configurations that can be suitable for use include, but are not limited to, imaging systems, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 170 typically includes at least one processor or processing unit 172 and memory 174. Depending on the exact configuration and type of computing device, memory 174 (storing, among other things, instructions to perform the image acquisition and processing methods disclosed herein) can be volatile (such as RAM), non-volatile (such as ROM, flash memory, etc.), or some combination of the two. This most basic configuration is illustrated in FIG. 1C by dashed line 176. Accordingly, the operating environment 170 may include a processor and memory storing instructions that when executed by the processor performs the operations discussed herein.

Further, environment 170 can also include storage devices (removable, 178, and/or non-removable, 181) including, but not limited to, magnetic or optical disks or tape. Similarly, environment 170 can also have input device(s) 184 such as touch screens, keyboard, mouse, pen, voice input, etc., and/or output device(s) 186 such as a display, speakers, printer, etc. Also included in the environment can be one or more communication connections 182, such as LAN, WAN, point to point, Bluetooth, RF, etc.

Operating environment 170 typically includes at least some form of computer readable media. Computer readable media can be any available media that can be accessed by processing unit 172 or other devices comprising the operating environment. As an example, the operating environment may include at least one processor and memory operatively connected to the at least one processor. The memory stores instructions, that when executed by the at least one processor cause the system to perform a set of operations, such as the operations described herein including the method operations discussed herein.

By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 170 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some embodiments, the components described herein comprise such modules or instructions executable by processing unit 172 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, processing unit 172 is part of a network that stores data in remote storage media for use by the processing unit 172.

Figure 2A:
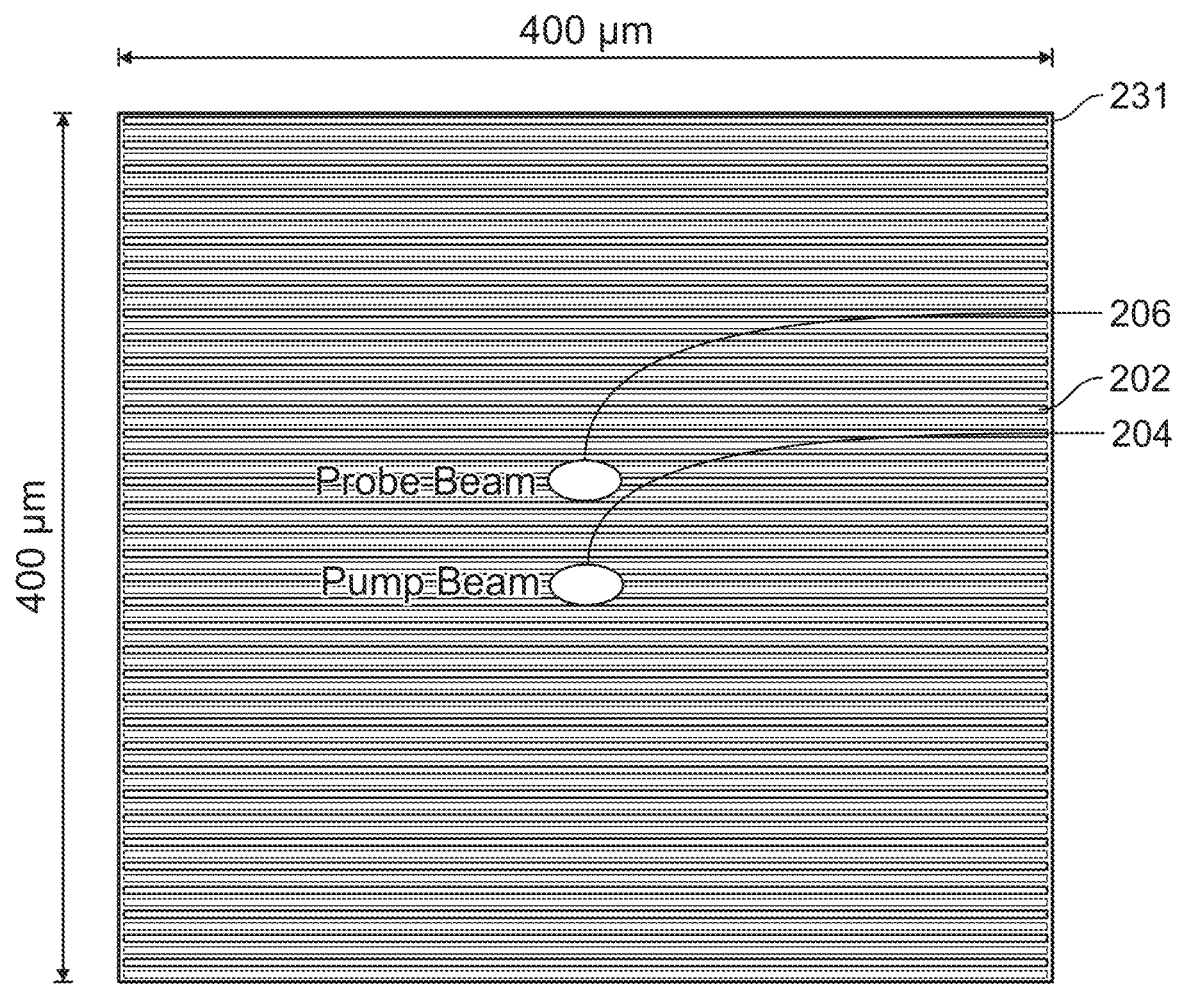
FIG. 2A depicts a top view of a sample.

FIG. 2A depicts a top view of a sample 231. The sample 231 includes a plurality of periodic structures 202. The sample 231 shown in FIG. 2A may be a portion of a larger sample. The periodic structures 202 repeat across the sample 231. In measuring characteristics of the periodic structures 202, the pump pulses in the pump beam may reach the surface of the sample 231 at first position 204 of the sample 231, and the probe pulses in the probe beam may reach the surface of the sample 231 at a second position 206 of the sample 231. The first position 204 and the second position 206 are physically separated from one another. The distance between the first position 204 and the second position 206 may be measured as a distance orthogonal to the length of the periodic structures.

FIG. 2A depicts a top view of a sample 231. The sample 231 includes a plurality of periodic structures 202. The sample 231 shown in FIG. 2A may be of a portion of a larger sample. The periodic structures 202 repeat across the sample 231. In measuring characteristics of the periodic structures 202, the pump pulses in the pump beam may reach the surface of the sample 231 at first position 204 of the sample 231, and the probe pulses in the probe beam may reach the surface of the sample 231 at a second position 206 of the sample 231. The first position 204 and the second position 206 are physically separated from one another. The distance between the first position 204 and the second position 206 may be measured as a distance orthogonal to the length of the periodic structures.

Figure 2B:
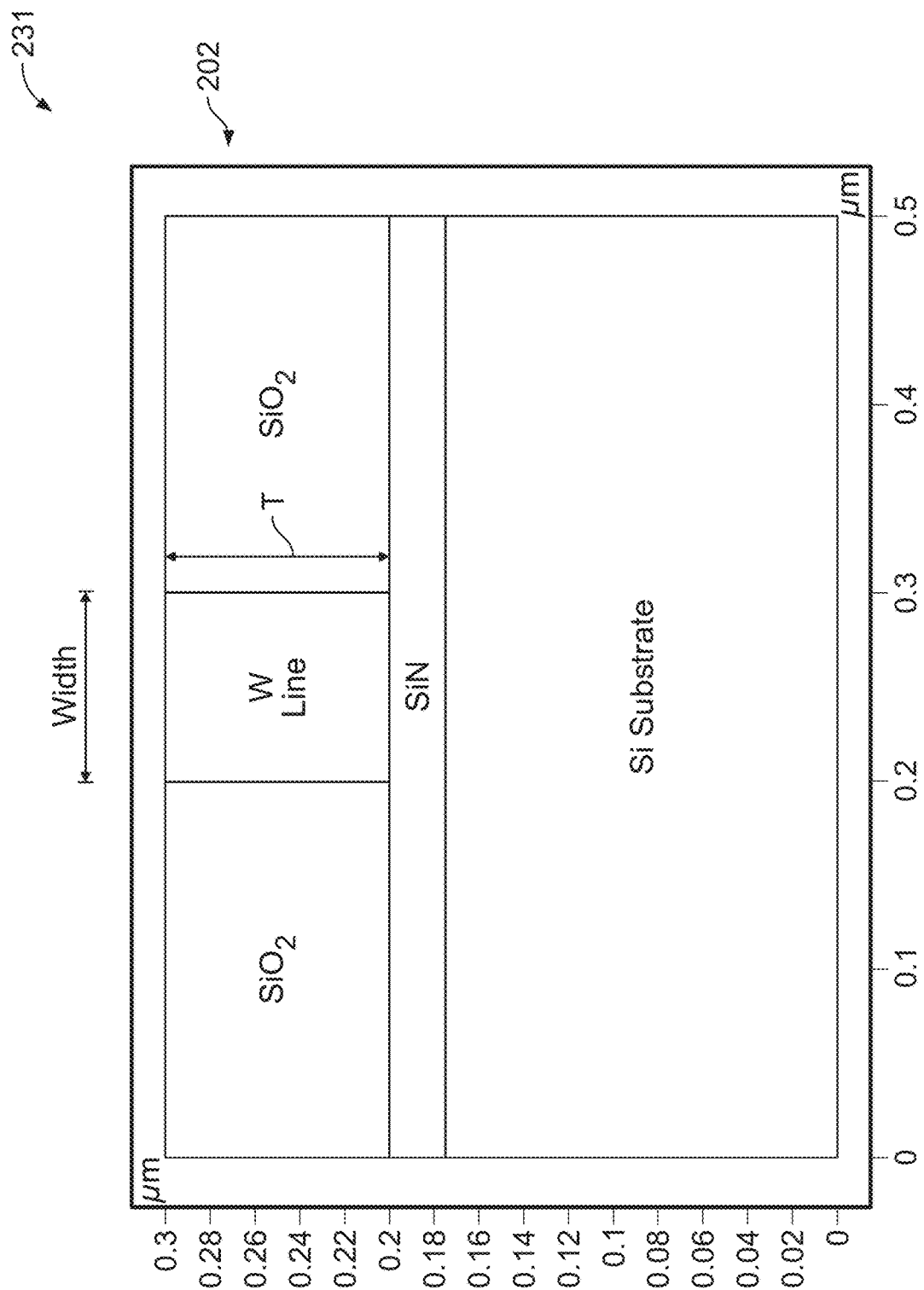
FIG. 2B depicts a cross-section side view of a sample.

FIG. 2B depicts a cross-section side view of a sample 231. The sample includes a tungsten (W) periodic structure 202. The periodic structure is separated by bands of silica or silicon dioxide ($SiO_2$). The sample may be formed on a substrate. The periodic structures 202 may be described by their width, thickness, and/or pitch. The width of each periodic structure 202 may also be referred to as the critical dimension (CD). The pitch is equivalent to the spacing between each periodic structure 202 and the width of the periodic structure 202.

The discussion below is of a particular set of experiments performed that demonstrate the present technology. While the experiments discuss particular measurements, techniques, and samples, it should be appreciated that the technology may be applied in different manners and to different samples to ultimately determine or measure the characteristics of periodic structures in a sample, such as the width and/or pitch of the periodic structures.

The measurements discussed below were performed on a special test vehicle consisting of periodic arrays of ~100 nm deep W lines with different widths (~50-100 nm) and pitch (~100-1000 nm). The metal lines were processed using the damascene process, e.g., empty trenches were first patterned on a SiO2 layer grown on a Si substrate using immersion lithography. The trenches were subsequently filled with 5 nm of physical-vapor deposited (PVD) Ti and atomic-layer deposited (ALD) TiN, 5 nm of ALD W and then fully filled with chemical-vapor deposited (CVD) W. Finally, the samples were chemically mechanically polished (CMP) until no metal remains on top of the SiO2.

The pulse duration of the laser at 520 nm is ~200 fsec, and the repetition rate is ~63 MHz. The angle of incidence is fixed at 45 degrees. For this specific study the pump was p-polarized and the probe s-polarized. The focal beam size was ~7×10 µm². Measurements were collected first with the pump and probe beams spatially overlapped and then separated. Measurements were made on patterned structures as well as buried patterned structures.

A finite element model (FEM) was also used to provide detailed insight and sensitivities of the vibrational modes to the parameters of the line array structure. The COMSOL™ Multiphysics software available from COMSOL AB, of Stockholm, Sweden was utilized. A two-dimensional model of the single line element cross-section with the lateral periodic boundary conditions and low-reflecting boundary conditions at the bottom was used to study experiments with the pump and probe beams overlapped. With reference to FIG. 2B, the thin Ti and TiN layers have been combined with the rectangular region representing W metal line. A line cross-section is assumed to be rectangular. Material properties for tungsten, silicon oxide, silicon and silicon nitride from COMSOL™ materials database were used. Thickness of the etch stop layer was assumed to be 25 nm based on the process target value.

In the PU techniques utilized, pump pulse duration is less than 0.4 ps but the typical time range of the measurement and simulations may be much slower at the pico- or nano-second time scale. In order to better understand the behavior, two different scenarios were simulated. In one scenario, time-dependent simulations were performed in the time range 0-4 ns with the effect of the pump simulated as quick (0.2 ps) pulse of the heat influx in the W line from the top surface. In the other, an initial temperature distribution was simulated that mimicked the energy absorption profile within the W line. All FEM analyses presented discussed in the experiment use the vertical displacement at the center of the top surface of the metal line to compare with the PU measured signal.

A PU signal is proportional to the change in the reflectivity of the probe beam, induced by the strain profile under the surface. Direct quantitative comparison of both the time and frequency domain signals with FEM simulation results is not straightforward. The analysis includes comparing vibrational modes frequencies or other common characteristic features in time-domain signals to help better characterize the system.

Figure 3:
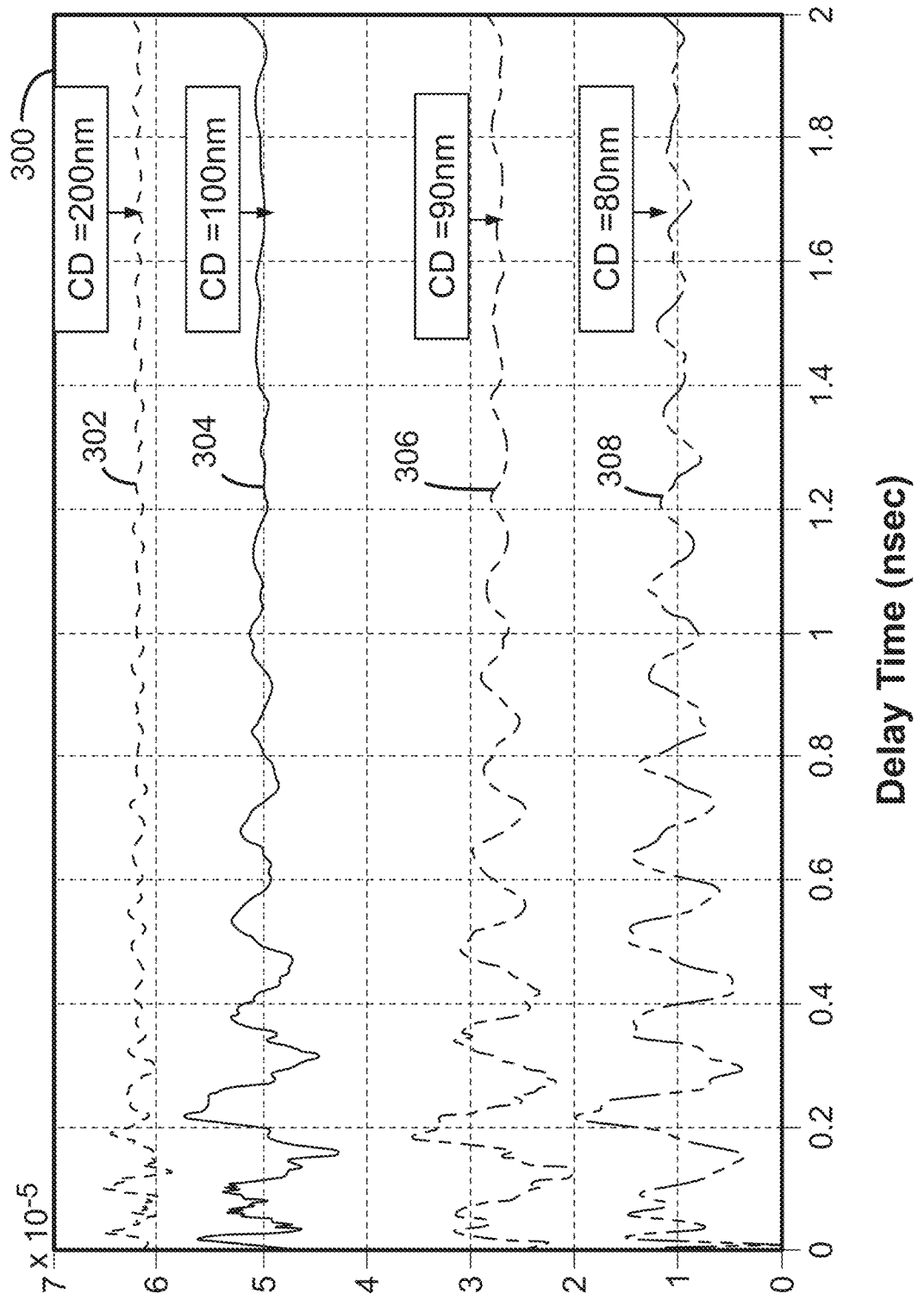
FIG. 3 shows the background subtracted differential reflectivity (ΔR) signal as a function of probe delay time on four different line arrays.

In a first portion of the experiment, measurements were taken where the pump and probe beams overlapped. For instance, the probe beam and pump beam were directed to the same measurement point on the sample. FIG. 3 shows plot 300 of the background subtracted differential reflectivity (ΔR) signal as a function of probe delay time on four different line arrays with same pitch (500 nm) but varying critical dimensions (CD) (80 nm, 90 nm, 100 nm, and 200 nm). The plot 300 includes a first signal 302 for a critical dimension of 200 nm, a second signal 304 for a critical dimension of 100 nm, a third signal 306 for a critical dimension of 90 nm, and a fourth signal 308 for a critical dimension of 80 nm.

Figure 4:
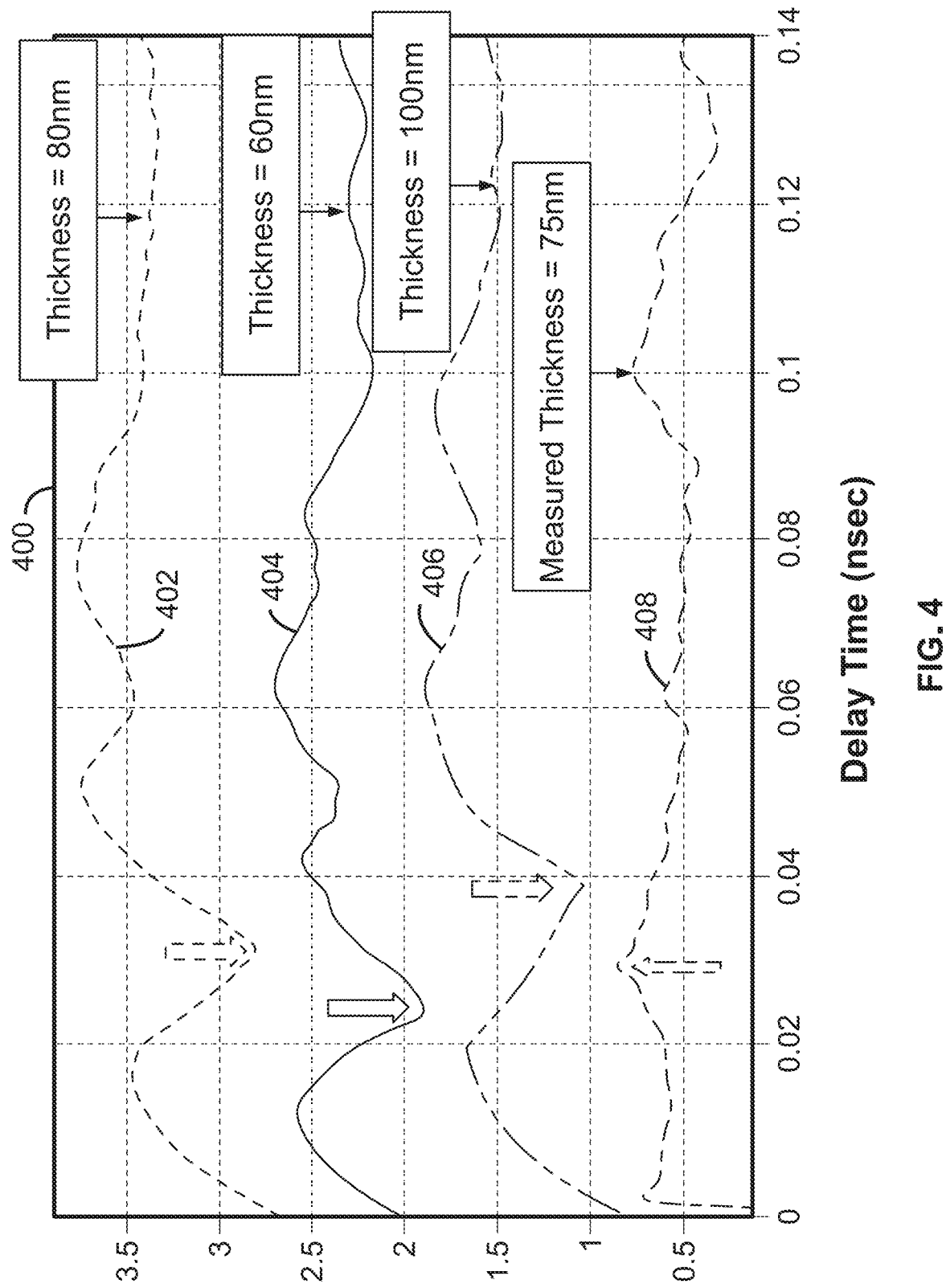
FIG. 4 shows a comparison of simulated data and measured data.

FEM simulations were performed for a line width of 200 nm and pitch of 500 nm for varying line depth (60 nm, 80 nm, and 100 nm). FIG. 4 depicts a plot 400 showing a comparison of the simulated data signals, represented by signals 402, 404, and 406, and the measured data, represented by signal 408. The overall signal profile consists of different acoustic modes corresponding to lateral propagation of sound and also propagation in the bulk from the top of the surface to the bottom of the metal lines. It is reasonable to expect that different modes will provide information sensitive to different dimensions of the structure, e.g., pitch, width, and thickness of the lines. A strong feature seen between ~24-38 ps is attributed to the acoustic pulse reflecting from the bottom of the W line reaching the surface based on the sound velocity of W of ~50 A/psec. As pointed out earlier, direct comparison between PU signals and FEM simulated vertical displacement is not made due to the complexity. Notice that PU signal sign of signal 408 is reversed relative to the FEM traces 402, 404, and 406.

On the measured signal, the acoustic feature is at ~29 ps and corresponds to a line thickness of ~75 nm. Based on this, the mode frequency values obtained from FEM simulations used here for comparison with the measured mode frequencies assume lines thickness of 75 nm.

Figure 5B:
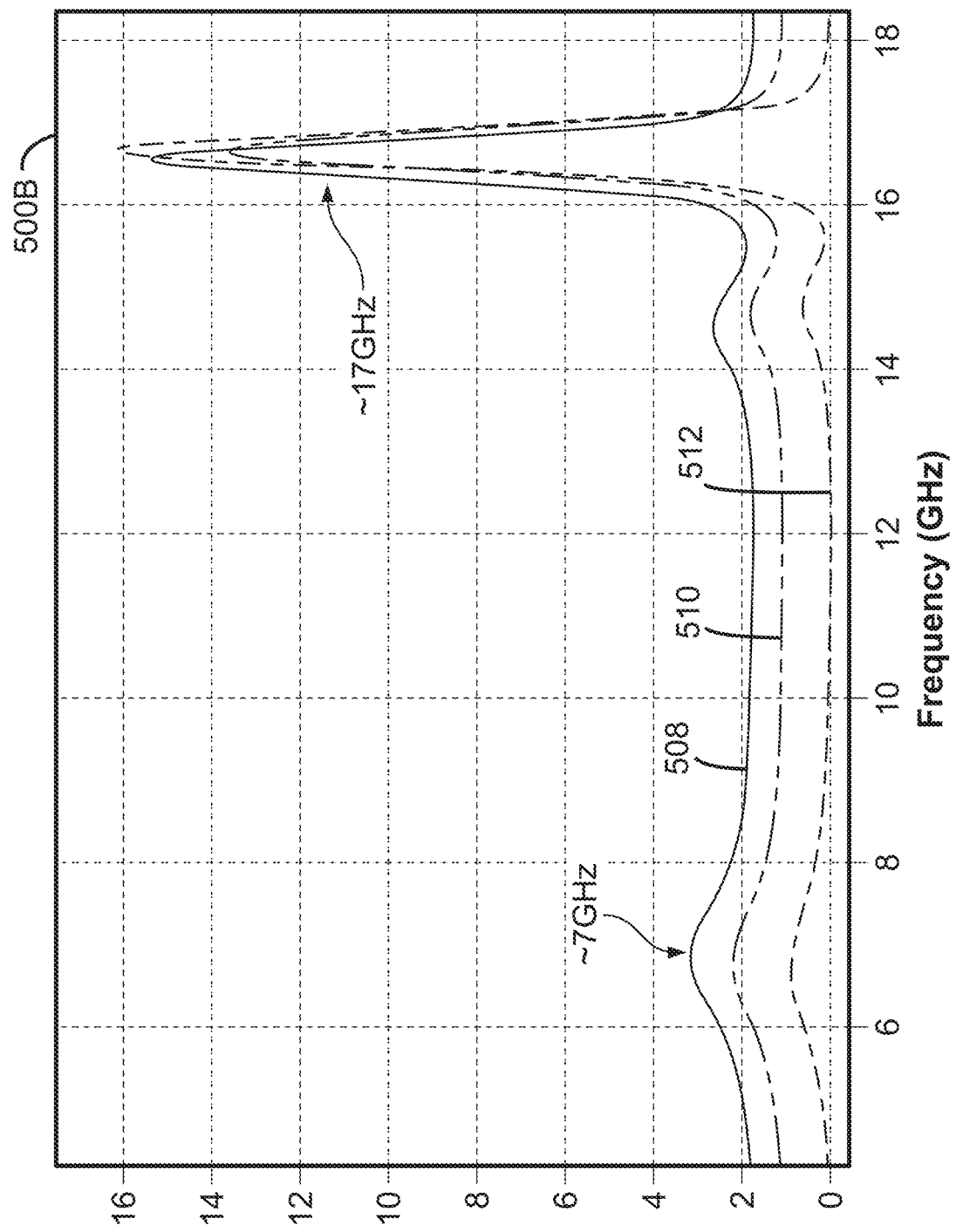

FIGS. 5A-5B depict plots 500A, 500B of a Fourier Transform (FT) for data presented in FIG. 3. More specifically, FIGS. 5A-5B depict FT of signals for line arrays with pitch=500 nm and varying line widths. FIG. 5A depicts a measured PU signal 502 for line width 80 nm, a measured PU signal 504 for line width 90 nm, and a measured PU signal 506 for line width 100 nm. FIG. 5B depicts the corresponding FEM simulated FT spectra of the vertical displacement, with a signal 508 for line width 80 nm, a signal 510 for line width 90 nm, and a signal 512 for line width 100 nm. The frequencies in the signal correspond to the various acoustic modes that are excited. The frequency spectra obtained from the simulations are also shown for comparison. The focus of the experiment was on modes with frequencies between 7 GHz, and 20 GHz. A mode ~12 GHz does not appear in the FEM simulations of the model with single W line. As discussed further below, the measurements with pump and probe separated in the direction perpendicular to the lines, show this frequency being associated with a wave traveling along the top surface of the array perpendicular to the lines direction. This mode is incompatible with the periodic boundaries on the left and right borders of the single W line FEM model. In general, simulations are in good agreement with the experiment. It is also interesting to note that the FT signals show a distinct sensitivity to different line CD, at the constant pitch.

Figure 6:
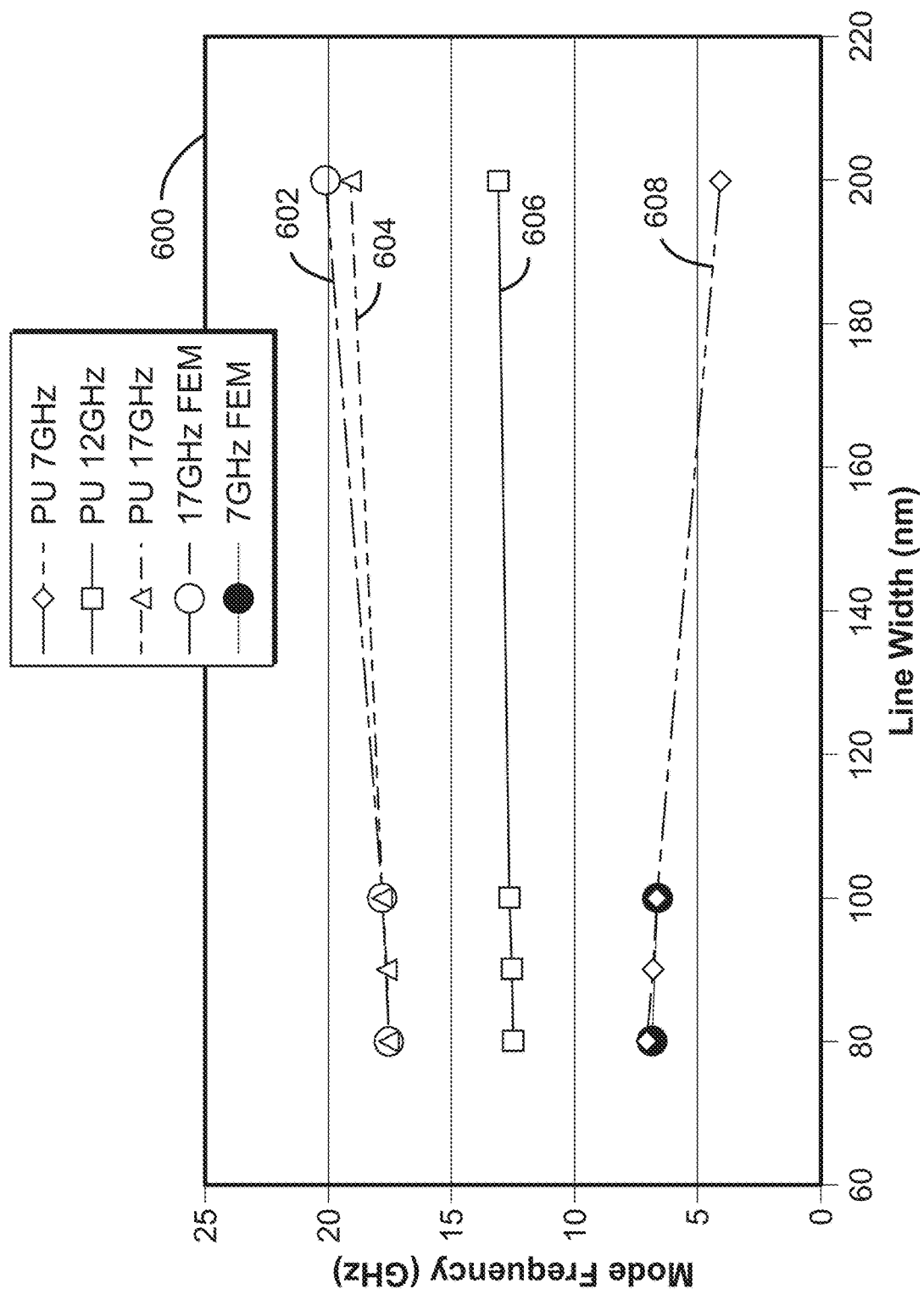
FIG. 6 depicts the sensitivity of mode frequencies to the line width (80 nm to 200 nm).

FIG. 6 depicts a plot of the sensitivity of mode frequencies to the line width (80 nm to 200 nm). Frequencies from the FEM model are comparable to the measured values, given a simple 2D periodic model that was constructed. In FIG. 6, frequencies of the vibrational modes of the line arrays with pitch 500 nm and various line widths are depicted. Circles show frequencies of the modes in the FEM simulated signals with the same line width and assumed line depth 75 nm.

In a second part of the experiment, the pump beam and the probe beam were spatially separated. An example of such a configuration is depicted in FIG. 2A, which shows the measurement site pattern on the wafer and orientation of the line array relative to the beam separation. This configuration is sensitive to the lateral traveling waves, as opposed to the sound waves propagating longitudinally into the substrate.

Figure 7:
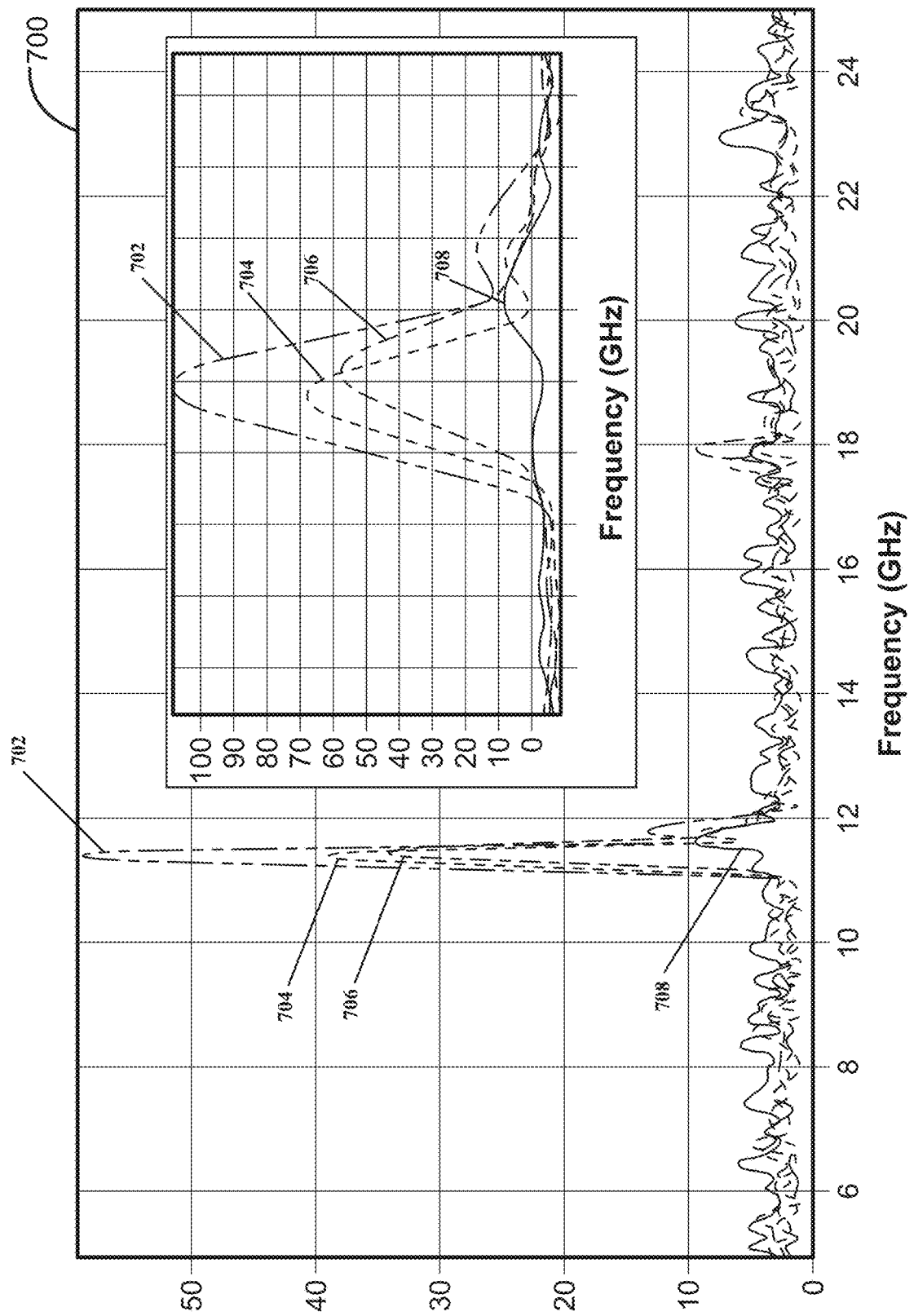
FIG. 7 shows a comparison of the frequency spectra.

FIG. 7 shows plot 700 a comparison of the frequency spectra obtained from the same samples discussed above, with the pump and probe beams separated by 12.5 μm. The plot 700 also includes an inset to more clearly see signals 702-706. Specifically, the plot 700 in FIG. 7 shows FT of signals for line arrays with varying CD with pump and probe beams spatially separated at 80 nm (signal 704), 90 nm (signal 702), 100 nm (signal 706), and 200 nm (signal 708). As expected, with the pump and probe beams spatially separated, the probe is not sensitive to the sound waves traveling down into the substrate. The dominant mode is identified to be at ~12 GHz as highlighted in the inset of plot 700 in FIG. 7. The peaks correspond to the acoustic waves propagating laterally at or near the surface of the samples. It is evident that the frequency of the dominant mode varies corresponding to the width of the line arrays.

Figure 8A:
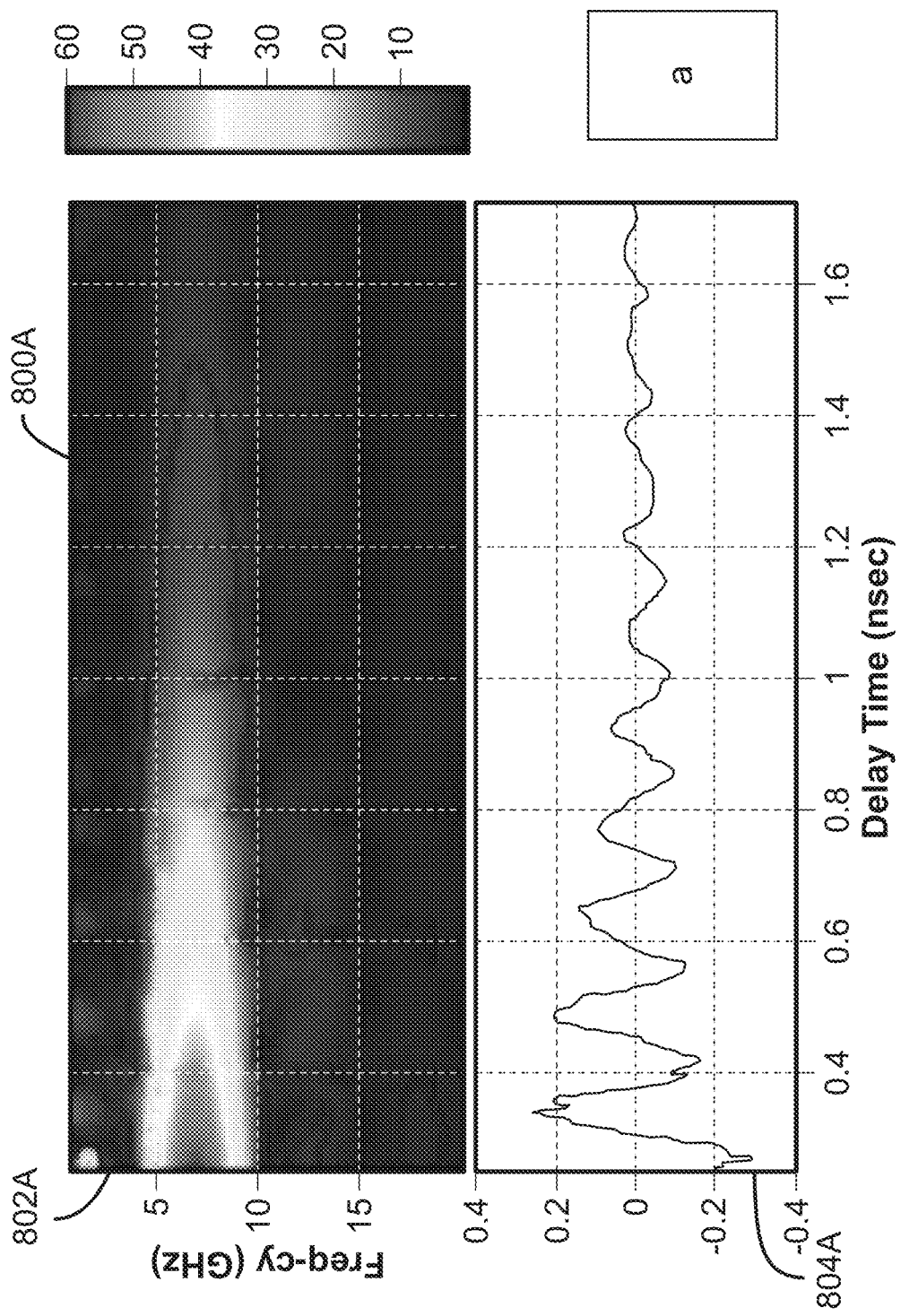
FIGS. 8A-8D show a series of periodograms.
Figure 8B:
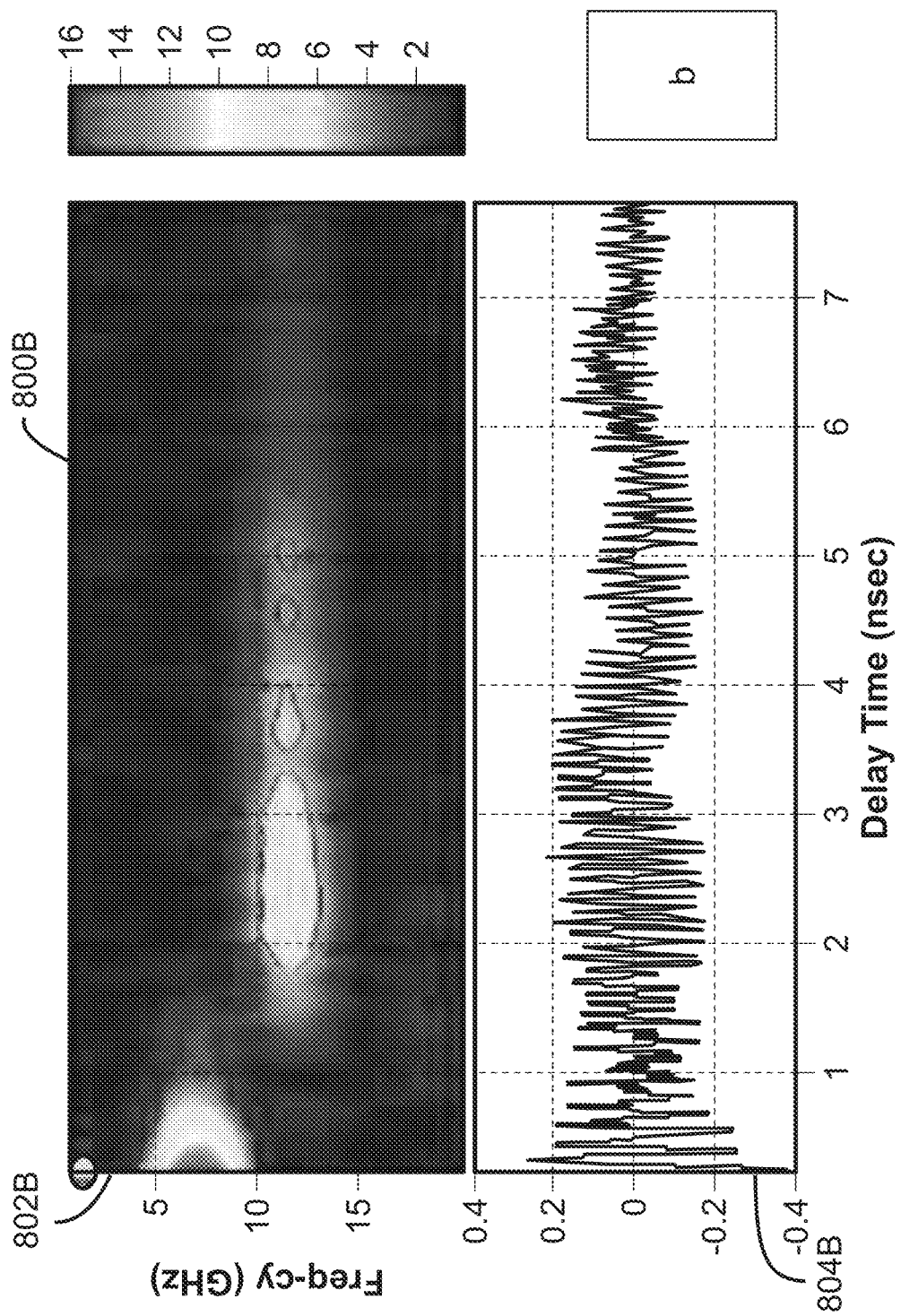
Figure 8C:
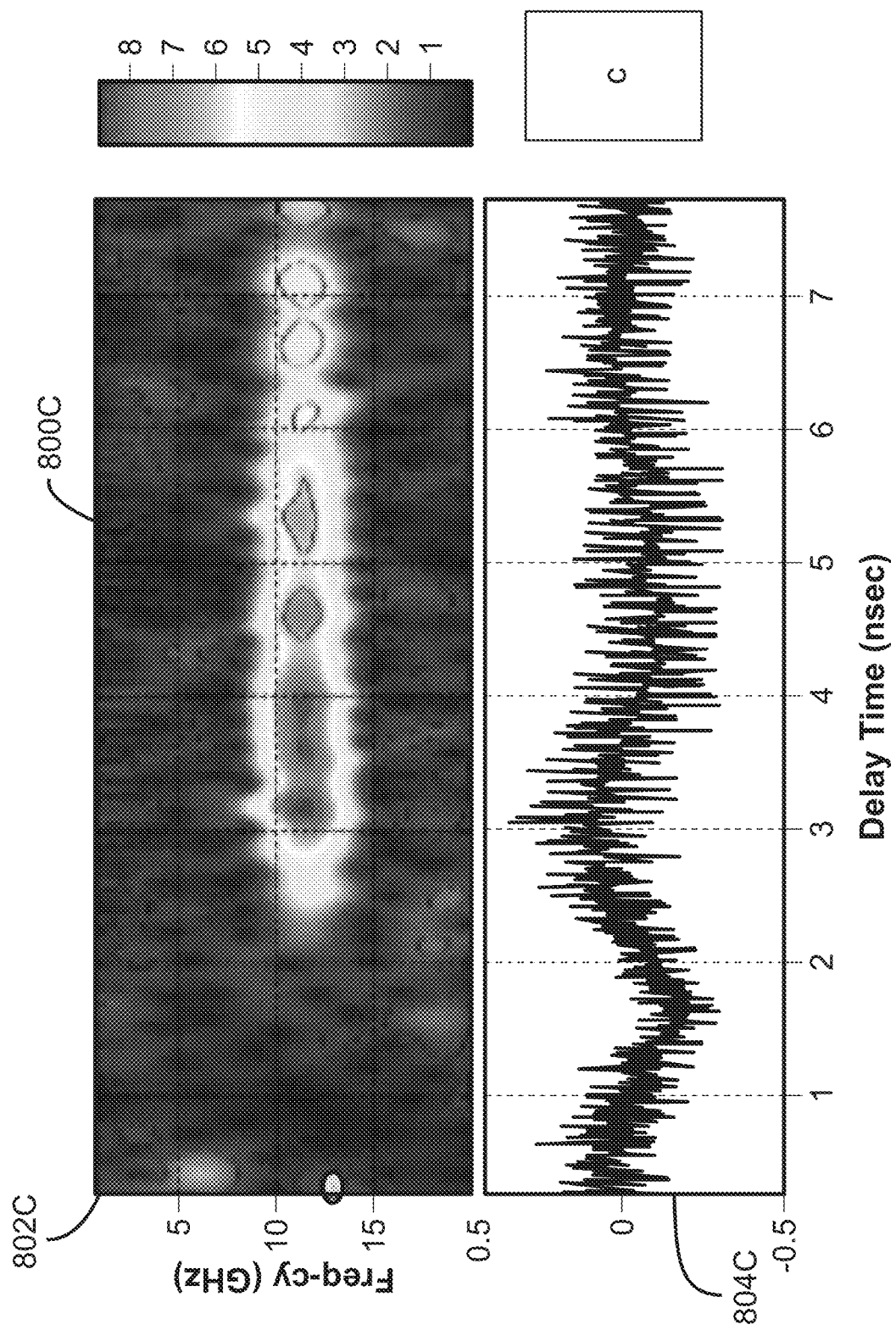
Figure 8D:
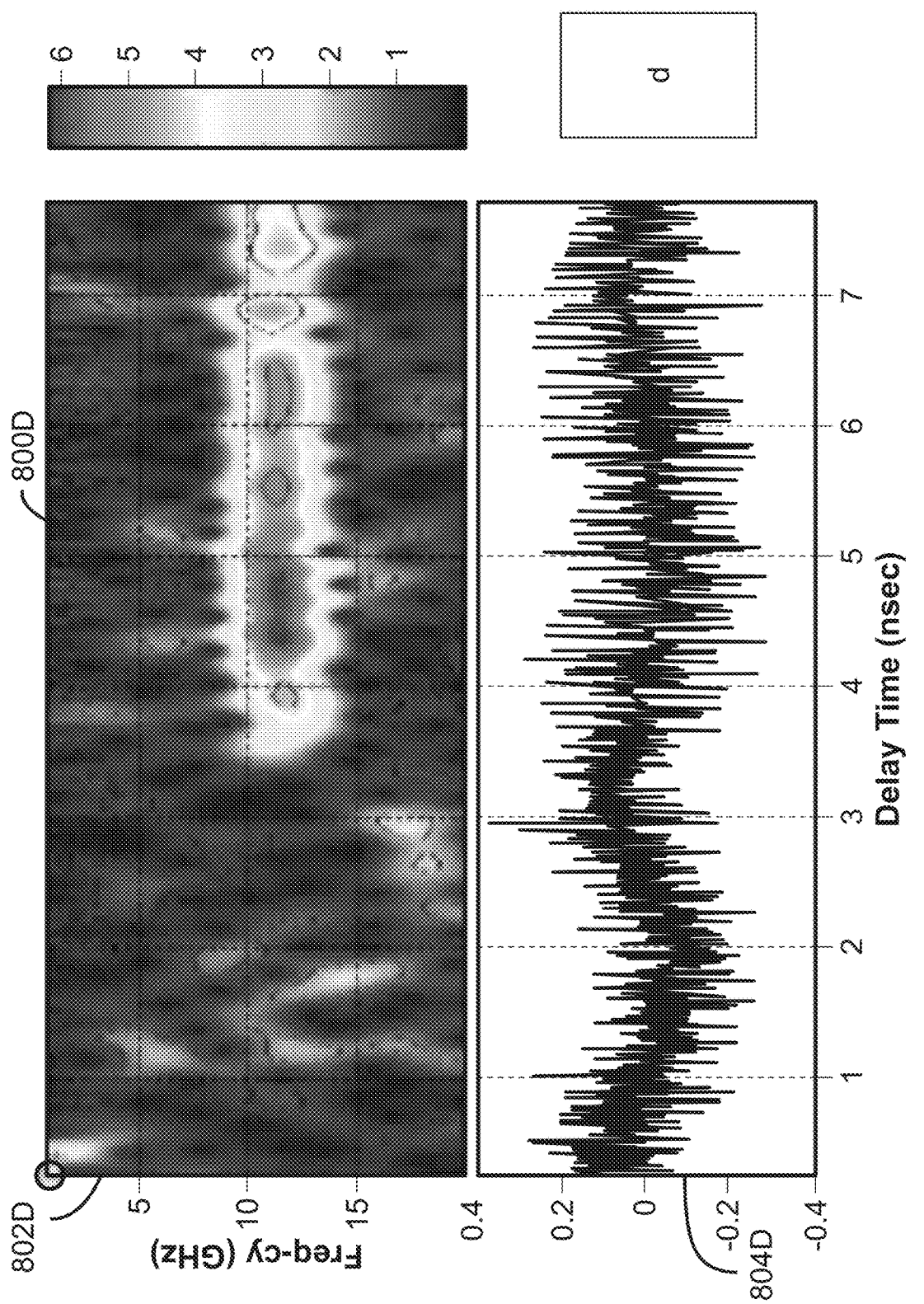

FIGS. 8A-8D show a series of periodograms 800A-800D that illustrate the dominance of different frequency peaks at different times as a function of the overlap between pump and probe ranging from strong overlap to total separation. The upper panel 802A-D on the figures shows the periodogram of the time domain signal in the lower panel 804A-D, respectively. Periodogram is obtained by applying the sliding window to the signal and performing Fourier transform. Color of the periodogram represents FT amplitude at a given frequency (vertical axis) as the filter window is centered at a given time (horizontal axis). The periodograms and signals are for a sample having a line array with Pitch=500 nm, Line CD=90 nm with pump and probe beams spatially separated by different distances. The periodograms 800A-D show a laterally propagating surface mode with a frequency envelope between 10 and 15 GHz. In FIG. 8A, the pump and probe beams are overlapped. In FIG. 8B, the pump and probe beams are separated by 10 μm. In FIG. 8C, the pump and probe beams are separated by 15 μm. In FIG. 8D, the pump and probe beams are separated by 20 μm.

When the pump and probe beams are strongly overlapped (FIG. 8A), the dominant mode is ~7 GHz, consistent with FIG. 5A. As the beams get increasingly separated (10 μm to 20 μm offset, FIGS. 8B-8D), the ~7 GHz peaks start weakening and the ~11-13 Hz signal starts being more visible. With the two beams separated by more than 10 μm, that mode is the strongest. The intensity maximum on the periodograms moves to later times as the beam separation increases. These represent the propagation of surface wave pulse with the speed ~5 μm/ns and frequency centered around ~12-13 GHz. This roughly corresponds close to the wavelength, but somewhat lower than the array pitch of 500 nm. Unfortunately, the relatively low resolution of the periodograms does not allow more accurate estimates. Additional detailed FEM simulations and experiments may provide higher resolution and more accurate estimates.

Figure 9A:
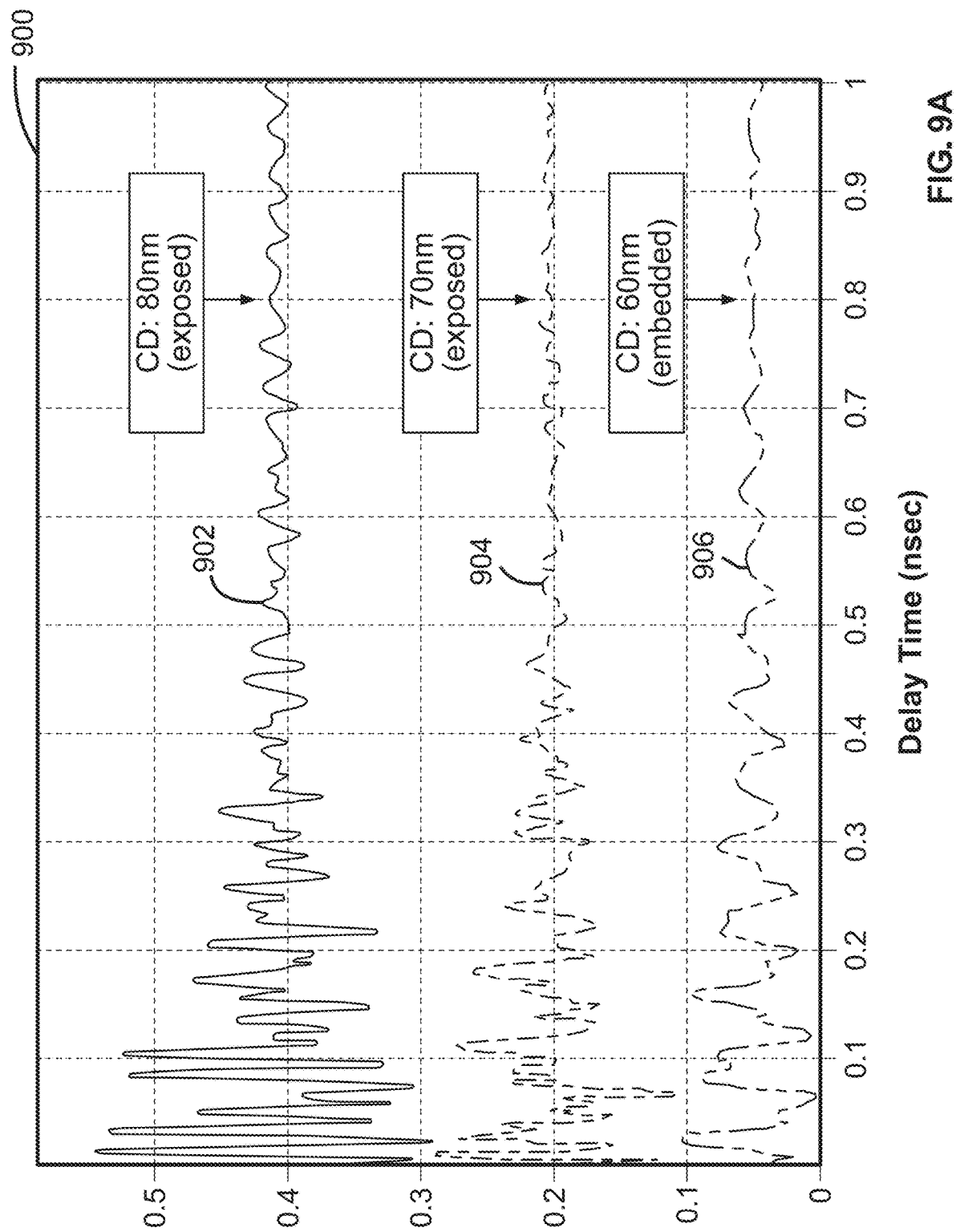
FIGS. 9A-B show the (ΔR) and FT signals respectively.
Figure 9B:
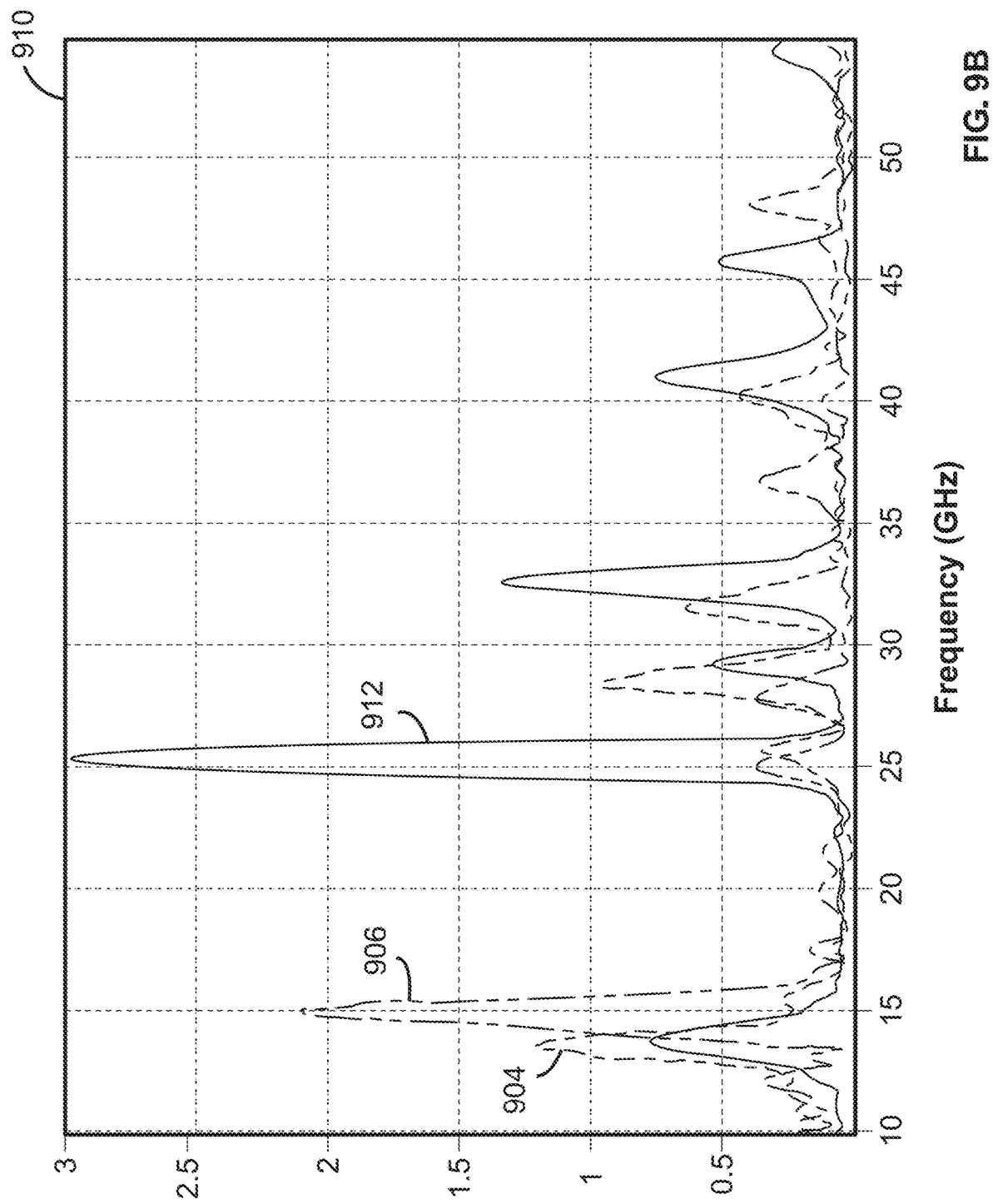

In yet another part of the experiment, sensitivity of the method and technology was evaluated in measuring patterned structures under a blanket film. The samples included all line arrays with the pitch of 200 nm with width varying from 60 nm to 80 nm. Signal 902 corresponds to a CD of 80 nm, and signal 904 corresponds to a CD of 70 nm. The line arrays with the width of 60 nm were embedded underneath a blanket layer of W of thickness of at least 10 nm, and the corresponding signal is signal 906. FIGS. 9A-9B show the (ΔR) and FT signals respectively. It is evident from the frequency profile of the curve for the embedded arrays (signal 906) that with a metal layer on top of the line arrays, fewer peaks are present.

For the case of flat metal film with no underlying metal line structure when pump and probe beams are overlapped, the PU signal is understood. A series of progressively attenuated echoes resulting from round trip propagation of longitudinal acoustics through the depth of the film are expected. In frequency domain, this multi-round-trip progression may manifest as a single mode with some possible harmonics contribution related to the detail of discrete time domain echo shape. Conversely, the signal for the case of buried metal lines (FIGS. 9A-9B, signal 906) shows multiple distinct modes indicative of the periodic line structure beneath the metal film surface.

Traditional optical critical dimension (OCD) metrology systems may also be used in the characterization of sub-micron arrays but prior to metal fill, but not after the metal fill. However, the PU technique discussed herein is viable option for also measuring pitch and width for both line arrays after post-CMP processes, and also when such structures are embedded underneath a metal layer.

The experiments have demonstrated that excitation frequency at or near surface acoustic dominant modes is sensitive to the width and pitch of W lines for array structures that are exposed. The experiments further show that PU is sensitive to the metal lines embedded underneath a metal layer. A systematic study of sensitivity of CD of metal lines buried under metal layers will be the subject of our future work as more samples are available. Time domain analysis makes it possible to determine the thickness of the lines by using the arrival time of the echoes, while the mode frequencies provide sensitivity to the line widths.

Among other benefits, this technology provides an extension of the metrology tool's capability to measure in-line on buried patterned structures either as a stand-alone solution or in a hybrid combination with OCD or other techniques to provide critical structural information for in-line process monitoring and control.

Figure 10:
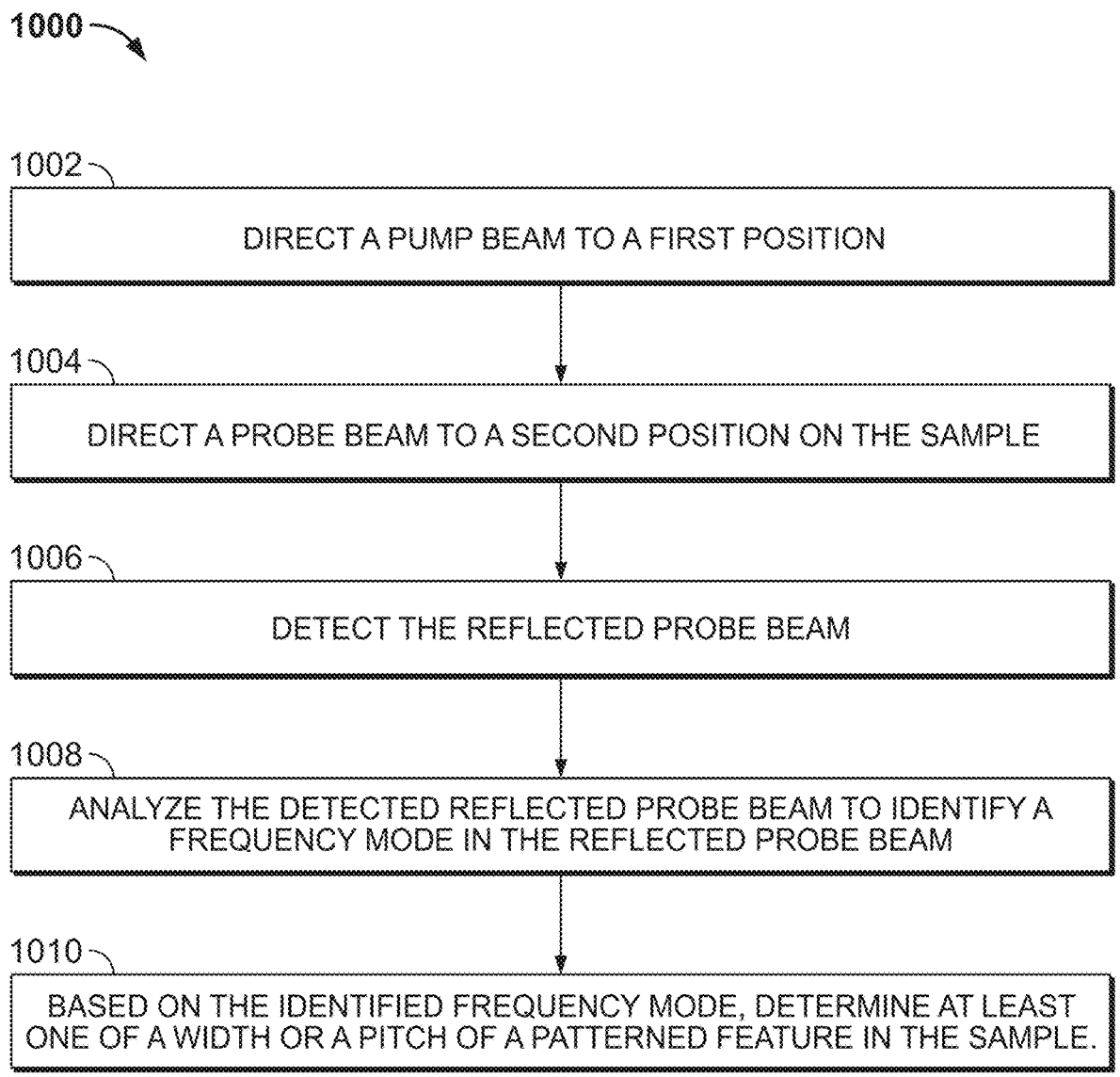
FIG. 10 depicts an example method for characterizing a sample.

FIG. 10 depicts an example method for analyzing a sample using opto-acoustic metrology. At operation 1002, a pump beam is directed to a first position on a surface of the sample. The pump beam induces surface acoustic waves and bulk acoustic waves in the sample as discussed above. At operation 1004, a probe beam is directed to a second position on the sample. In some examples, the first position and the second position may overlap. In other examples, the first position and second position may be separated by some distance. For instance, the separation distance may be at least 5 µm, 10 µm, 15 µm, or 20 µm. When the probe beam reflects from the surface of the sample, the probe beam is affected by at least the surface acoustic waves generated from the pump beam.

At operation 1006, the reflected probe beam is detected by a detector. The detector may convert the detected probe beam into an electric signal that can be processed. At operation 1008, the detected reflected probe beam is analyzed to determine or identify a frequency mode in the reflected probe beam that corresponds to a frequency mode of the surface acoustic wave. Identifying a frequency mode may include a Fourier Transform of the signal or other methods for identifying frequency modes within a signal. The frequency mode may be between 1 GHz and 50 GHz. Operation 1008 may also include determining other features from the probe beam, such as a delay until that frequency mode appears. Based on the frequency mode and/or the delay determined in operation 1008, at least one of a width or pitch of a patterned feature or structure of the sample may be determined in operation 1010. For example, the patterned feature may be a metal line, such as the tungsten line discussed above. The patterned feature may also be embedded under the surface of the sample. The width or critical dimension of the patterned may be less than 200 nm, 100 nm, 50 nm, or smaller.

Figure 11:
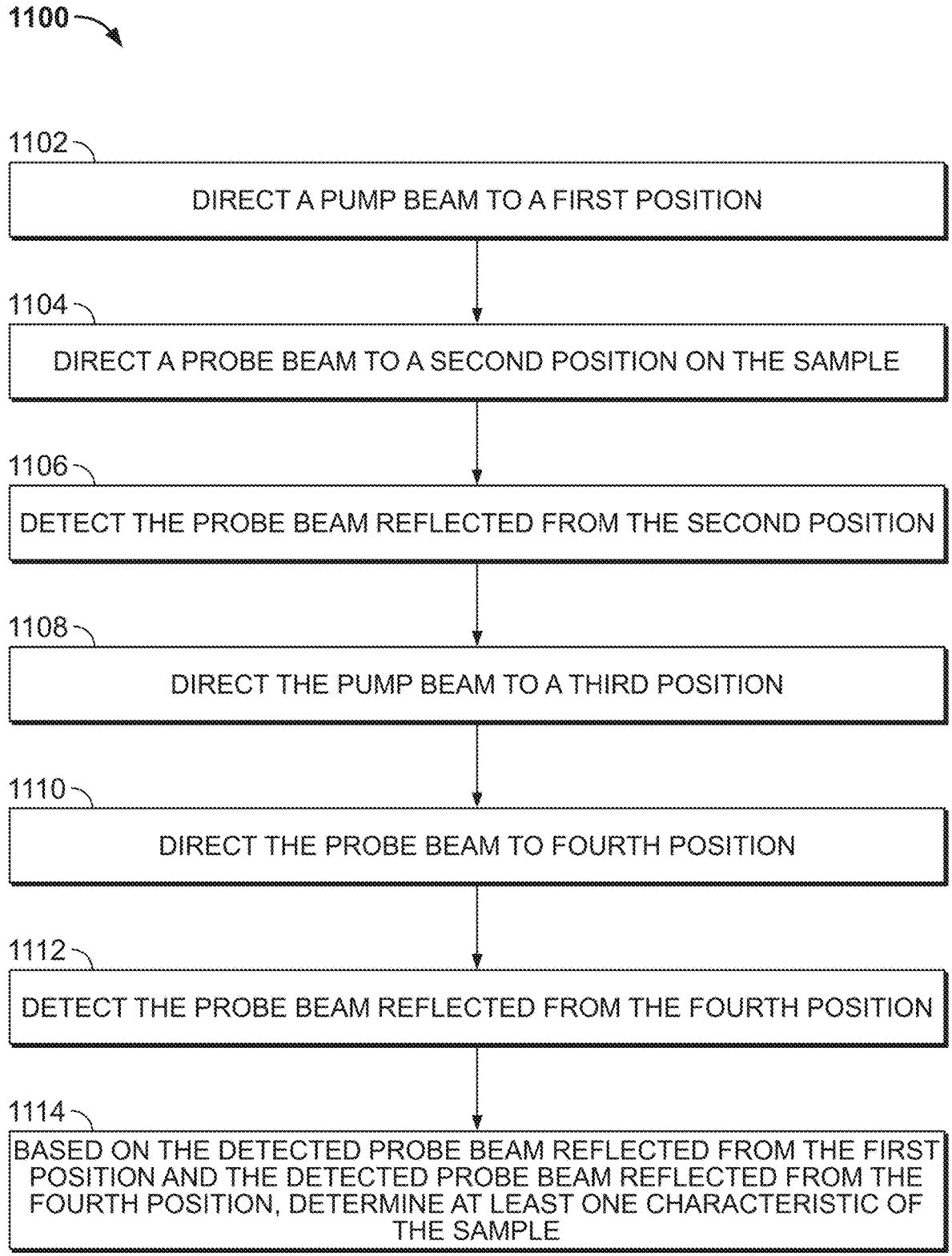
FIG. 11 depicts another example method for characterizing a sample.

FIG. 11 depicts another example method for analyzing a sample using opto-acoustic metrology. At operation 1102, a pump beam is directed to a first position on a surface of a sample to induce a first surface acoustic wave or a plurality of surface acoustic waves in the sample. At operation 1104, a probe beam is directed to a second position on the sample. When the probe beam reflects from the second position, the probe beam is affected by the surface acoustic waves. The first position and the second position may be separated by a first distance, which may be less than 10 µm among other possible distances. At operation 1106, the reflected probe beam is detected by a detector which may convert the detected probe beam to electric signal for analysis.

The separation distance of the pump and probe beams is then altered. At operation 1108, the pump beam is directed to a third position on the surface of the sample. The pump beam induces a second surface acoustic wave or plurality of surface acoustic waves from the third position. At operation 1110, the probe beam is directed to a fourth position on the surface of the sample. When the probe beam reflects from the fourth position, the probe beam is affected by the second surface acoustic wave or second plurality of surface acoustic waves. The third position and the fourth position are separated by a second distance, which may be greater than or less than the first distance, such as at least 15 µm. In some examples, the first position may be the same as the third position, or the second position may be the same as the fourth position. For example, only the position of one of the probe beam or the pump beam needs to be altered to change the separation distance. In some examples, however, both the location of the pump beam and the probe beam are altered. At operation 1112, the probe beam reflected from the fourth location is detected by a detector which may convert the detected probe beam to an electric signal to be analyzed.

At operation 1114, at least one characteristic of the sample is determined. The characteristic is determined based on detected probe beam reflected from the second position and the detected probe beam reflected from the fourth position. For example, the analysis may include determining or identifying a frequency mode of the detected probe beams and determining the characteristic based on the frequency mode. The analysis may also include determining a delay until the frequency mode is present, and the characteristic may be further based on that delay. The characteristic may be a pitch and/or width of a patterned structure, such as a metal line. The patterned structure may be embedded below the surface of the sample.

Subsequent to the operations performed in the methods discussed above, a decision may be made as whether to approve the sample based on the determined characteristics of the sample, such as the pitch and/or width of the patterned structure. For instance, the sample is intended to be manufactured having characteristics within certain tolerances. The acceptable tolerances or ranges may be predetermined. In some examples, the tolerances or ranges may be based on minimum or maximum characteristics required for operability of the sample. If the measured or determined characteristics of the sample fall within the expected thicknesses, pitches, widths, etc. and their respective tolerances, the sample may be approved. If the determined characteristics do not fall within the expected tolerances, the sample may be rejected.

If the sample is approved, additional manufacturing steps are performed. In examples where the sample is a wafer, the additional manufacturing steps include operations such as back grinding the wafer. Manufacturing steps may also include cleaning and other finishing operations for the samples, including packaging operations. In some examples, the additional manufacturing steps may include additional testing such as electrical testing of semiconductor devices or chips on the wafer. For instance, electrical tests may be performed on each chip on the wafer to determine if the chips function properly or as expected. The chips may be virtually sorted into to virtual bins based on their test results. The chips that fail the test may be marked as bad or failed and be placed into a fail virtual bin for failed chips. Conversely, the chips that pass the test may be marked as good or passing and be placed into a pass virtual bin. Subsequent to testing, the wafer may be thinned and subsequently cut into individual chips. The chips that have been marked as passing the tests are packaged, such as into a memory card or storage device among other computer chip devices or applications. The percentage of chips that are approved from testing may generally be referred to as the yield. Once the chips have been packaged, they may be further tested to help ensure that the bonds from the chip to the remainder of the package or device have been properly formed and performance is still within acceptable limits. The packaged devices that are approved may then be further incorporated into a computing device. For example, where the chips of the wafer are packaged into a storage device, the storage device may be installed or incorporated into a computing device, such as a laptop or mobile phone.

If the sample is not approved, the sample is rejected and may be discarded. The rejected sample may be salvageable or recyclable in some instances. By measuring or inspecting the samples prior to performing the additional manufacturing steps, such as back grinding and cleaning, the additional manufacturing steps are performed only on the samples that are acceptable or within tolerance. Accordingly, resources are not wasted on finishing samples that are unacceptable or outside of tolerances.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:

1. A method for characterizing a patterned structure of a sample, the method comprising:
   directing a plurality of pump beams and associated probe beams to be incident on a surface of the sample, wherein pump beams and associated probe beams are controlled to be incident on the surface of the sample at different distances from each other, wherein each pump beam induces a surface acoustic wave in the sample, and each probe beam is affected by the surface acoustic wave induced by an associated pump beam when the each probe beam reflects from the surface of the sample;
   detecting reflected probe beams;
   analyzing the detected reflected probe beams to identify frequency modes in the reflected probe beams as a function of the different distances between the probe beams and associated pump beams; and
   based on the identified frequency modes, determining at least one of a width or a pitch of a patterned feature in the sample.

2. The method of claim 1, wherein the frequency modes are between 1 GHz and 50 GHz.

3. The method of claim 1, wherein the different distances between the probe beams and associated pump beams comprises overlap between the probe beams and the associated pump beams on the surface of the sample.

4. The method of claim 3, wherein the different distances between the probe beams and associated pump beams further comprises complete separation between the probe beams and the associated pump beams on the surface of the sample.

5. The method of claim 1, wherein the patterned feature is a metal line.

6. The method of claim 1, wherein the patterned feature is embedded under the surface of the sample.

7. The method of claim 1, wherein the width of the patterned feature is less than 200 nm.

8. The method of claim 1, further comprising performing additional manufacturing steps on the sample.

9. A method for characterizing a sample, the method comprising:
   directing a pump beam to a first position on a surface of the sample to induce a first surface acoustic wave in the sample;
   directing a probe beam to a second position on the sample, wherein the probe beam is affected by the first surface acoustic wave when the probe beam reflects from the second position, wherein the first position is separated from the second position by a first distance;
   detecting the probe beam reflected from the second position;
   directing the pump beam to a third position on the surface of the sample to induce a second surface acoustic wave;
   directing the probe beam to a fourth position on the surface of the sample, wherein the probe beam is affected by the second surface acoustic wave when the probe beam reflects from the fourth position, wherein the third position is separated from the fourth position by a second distance that is different than the first distance;
   detecting the probe beam reflected from the fourth position;
   analyzing the detected probe beam reflected from the second position and the detected probe beam reflected from the fourth position to identify frequency modes as a function of the first distance and the second distance; and
   based on the identified frequency modes, determining at least one characteristic of the sample.

10. The method of claim 9, wherein the at least one characteristic is a characteristic of a patterned feature embedded below the surface of the sample.

11. The method of claim 9, wherein the at least one characteristic is a characteristic of a patterned feature.

12. The method of claim 9, further comprising determining a frequency mode of at least one of the detected probe beam reflected from the second position and the detected probe beam reflected from the fourth position.

13. The method of claim 12, wherein determining the at least one characteristic is further based on the determined frequency mode.

14. The method of claim 12, further comprising determining a delay until the frequency mode is present.

15. The method of claim 14, wherein determining the at least one characteristic is further based on the determined delay.

16. The method of claim 9, where the first distance is less than 10 μm and the second distance is at least 15 μm.

17. The method of claim 9, further comprising performing additional manufacturing steps on the sample.

18. The method of claim 9, wherein the first distance and the second distance are adjustable and determining the at least one characteristics of the sample is further based at least partially on the first distance and the second distance.

19. A method for characterizing a sample, the method comprising:
    directing a pump beam to a first position on a surface of the sample to induce a first surface acoustic wave in the sample;
    directing a probe beam to a second position on the sample, wherein the probe beam is affected by the first surface acoustic wave when the probe beam reflects from the second position, wherein the first position is separated from the second position by a first distance;
    detecting the probe beam reflected from the second position;
    directing the pump beam to a third position on the surface of the sample to induce a second surface acoustic wave;
    directing the probe beam to a fourth position on the surface of the sample, wherein the probe beam is affected by the second surface acoustic wave when the probe beam reflects from the fourth position, wherein the third position is separated from the fourth position by a second distance that is different than the first distance, wherein the first position and the third position are a same position and the second position is different than the fourth position;
    detecting the probe beam reflected from the fourth position; and
    based on the detected probe beam reflected from the second position and the detected probe beam reflected from the fourth position, determining at least one characteristic of the sample.

20. The method of claim 9, wherein the second position and the fourth position are a same position and the first position is different than the third position.

21. A system for characterizing a patterned structure in a sample, the system comprising:
    at least one light source for generating a plurality of pump beams and a plurality of associated probe beams;
    optical components configured to direct pump beams and associated probe beams to be incident on a surface of the sample at different distances from each other;
    a detector configured to detect probe beams after reflecting from the surface of the sample;
    a processor; and
    memory storing instructions that when executed by the processor cause the processor to perform a set of operations comprising:
        identifying frequency modes in the detected probe beams as a function of the different distances between the probe beams and associated pump beams; and
        based on the identified frequency modes, determining at least one of a width or a pitch of the patterned structure.

22. The system of claim 21, wherein the patterned structure is embedded under the surface of the sample.

23. The system of claim 21, wherein the different distances between the probe beams and associated pump beams comprise overlap between the probe beams and the associated pump beams on the surface of the sample and complete separation between the probe beams and the associated pump beams on the surface of the sample.

\* \* \* \* \*

UNITED STATES PATENT AND TRADEMARK OFFICE
CERTIFICATE OF CORRECTION

| | | |
|---|---|---|
| PATENT NO. | : 11,988,641 B2 | Page 1 of 1 |
| APPLICATION NO. | : 17/217527 | |
| DATED | : May 21, 2024 | |
| INVENTOR(S) | : Manjusha Mehendale et al. | |

It is certified that error appears in the above-identified patent and that said Letters Patent is hereby corrected as shown below:

In the Specification

Column no -9, Line no 05-17, Delete the following text "FIG. 2A depicts a top view of a sample 231. The sample 231 includes a plurality of periodic structures 202. The sample 231 shown in FIG. 2A may be of a portion of a larger sample. The periodic structures 202 repeat across the sample 231. In measuring characteristics of the periodic structures 202, the pump pulses in the pump beam may reach the surface of the sample 231 at first position 204 of the sample 231, and the probe pulses in the probe beam may reach the surface of the sample 231 at a second position 206 of the sample 231. The first position 204 and the second position 206 are physically separated from one another. The distance between the first position 204 and the second position 206 may be measured as a distance orthogonal to the length of the periodic structures."

Column no -11, Line no 49-51, Change "The dominant mode is identified to be at -12 GHz as highlighted in the inset of plot 700" to read as "The dominant mode is identified to be at ~12 GHz as highlighted in the inset of plot 700"

Column no -12, Line no 04-06, Change "In FIG. 8B, the pump and probe beams are separated by 10☐m. In FIG. 8C, the pump and probe beams are separated by 15☐m." to read as "In FIG. 8B, the pump and probe beams are separated by 10 μm. In FIG. 8C, the pump and probe beams are separated by 15 μm."

Signed and Sealed this
Eleventh Day of March, 2025

Coke Morgan Stewart
*Acting Director of the United States Patent and Trademark Office*